(12) United States Patent
Bosio

(10) Patent No.: US 6,617,548 B1
(45) Date of Patent: Sep. 9, 2003

(54) MOBILE DEVICE FOR AUTOMATIC PIPE WELDING

(75) Inventor: Paolo Bosio, Torre Boldone (IT)

(73) Assignee: PSI Pipeline Service, S.A., Lugano (CH)

(*) Notice: Subject to any disclaimer, the term of this patent is extended or adjusted under 35 U.S.C. 154(b) by 0 days.

(21) Appl. No.: 09/744,462
(22) PCT Filed: Jul. 15, 1999
(86) PCT No.: PCT/EP99/05000
§ 371 (c)(1), (2), (4) Date: Apr. 9, 2001
(87) PCT Pub. No.: WO00/05025
PCT Pub. Date: Feb. 3, 2000

(30) Foreign Application Priority Data

Jul. 24, 1998 (IT) .......................................... MI98A1724

(51) Int. Cl.[7] ................................................ B23K 9/12
(52) U.S. Cl. ............................... 219/125.12; 219/125.11
(58) Field of Search ......................... 219/125.12, 125.1, 219/125.11, 124.34

(56) References Cited

U.S. PATENT DOCUMENTS

| | | | |
|---|---|---|---|
| 3,515,844 A | * | 6/1970 | Colarossi et al. ...... 219/125.12 |
| 3,681,564 A | * | 8/1972 | Hiyama et al. ........ 219/125.12 |
| 3,718,798 A | * | 2/1973 | Randolph et al. ...... 219/125.12 |
| 3,777,115 A | * | 12/1973 | Kazlauskas et al. ... 219/125.12 |
| 3,806,694 A | * | 4/1974 | Nelson et al. ......... 219/125.12 |
| 4,051,342 A | * | 9/1977 | Stubbings .............. 219/125.11 |
| 4,132,338 A | * | 1/1979 | Bove et al. ............ 219/125.12 |
| 4,151,395 A | * | 4/1979 | Kushner et al. ....... 219/125.12 |
| 4,163,886 A | * | 8/1979 | Omae et al. ........... 219/125.11 |
| 4,495,400 A | * | 1/1985 | Thompson ............. 219/125.12 |
| 5,676,857 A | * | 10/1997 | Parker ................... 219/125.11 |
| 5,932,123 A | * | 8/1999 | Marhofer et al. ...... 219/125.12 |

* cited by examiner

Primary Examiner—Clifford C. Shaw
(74) Attorney, Agent, or Firm—Steinberg & Raskin, P.C.

(57) ABSTRACT

A device for butt welding pipes (99A–B) comprises: a guide element (17) which can surround and can be fixed to one of the ends of the pipes, and a carriage (1) movable along the said guide element and having powered means (25) for moving it along the guide element (17), a welding torch (90), means (29) for feeding it and means (26) for supporting the said welding torch (90) and moving it vertically and horizontally with respect to the said carriage, and means of movement (27) for imparting the oscillatory movement to the said torch and for regulating the amplitude of oscillation and the position of the torch during this oscillation; the regulating and monitoring means (108) are of the electronic type; and means (104) are provided for generating a signal relating to the angular movement of the welding torch (90) during the oscillation.

11 Claims, 28 Drawing Sheets

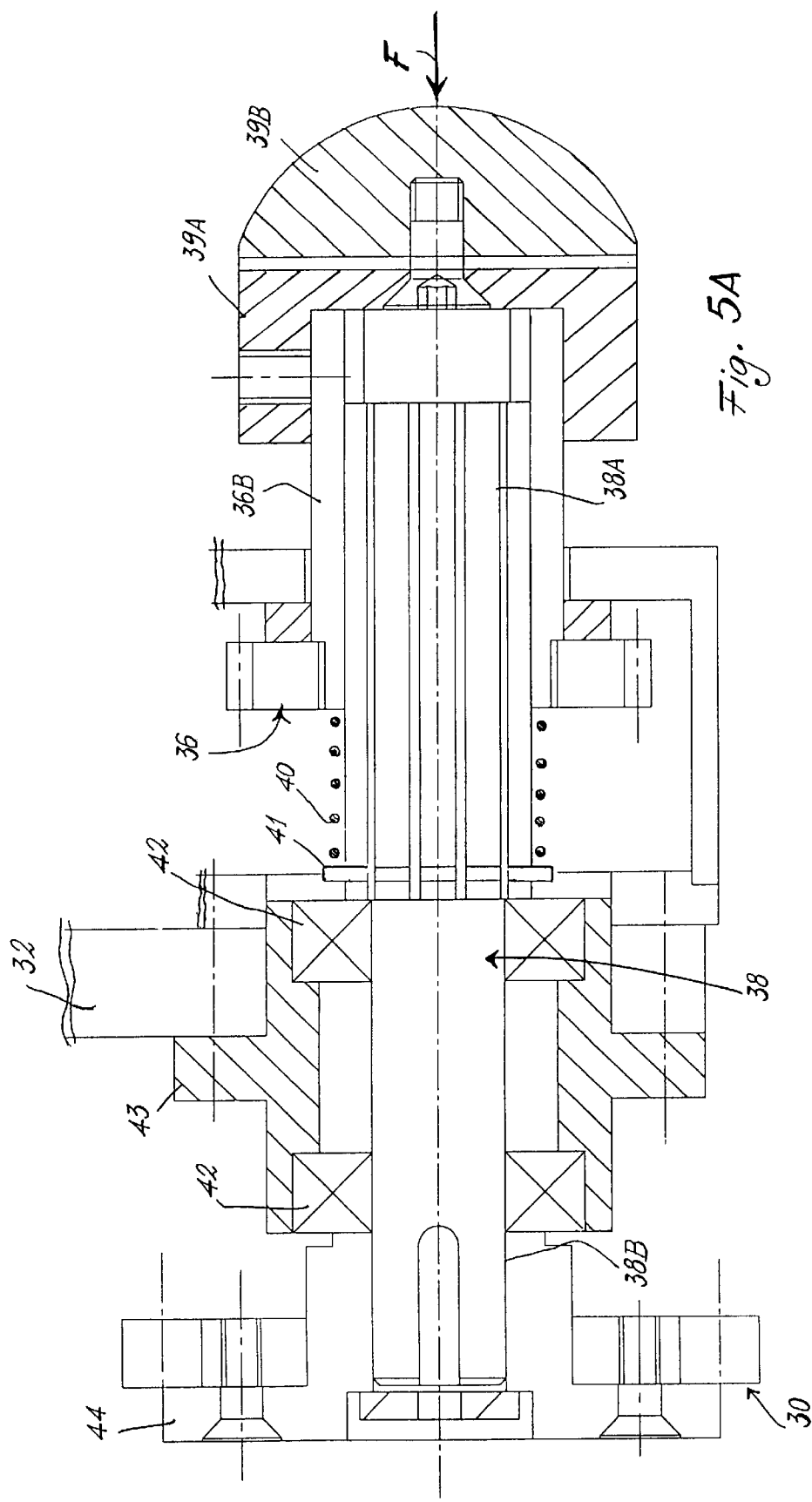

| REMOTE UNIT CODE: XXX<br>WRITE PASSWORD | — 140 |

| UNIT OF MEASUREMENT PRESS:<br>ENT KEY FOR CM<br>ESC KEY FOR INCHES | — 141 |

| DISPLAY STORED PARAMETERS<br>PRESS ENT KEY TO DISPLAY<br>PRESS ESC KEY TO CONTINUE | — 142 |

| SEND STORED DATA<br>PRESS ENT KEY TO SEND<br>PRESS ESC KEY TO CONTINUE | — 143 |

| DISPLAY ERRORS<br>PRESS ENT KEY TO DISPLAY<br>PRESS ESC KEY TO CONTINUE | — 144 |

| TEST<br>ENT TO CARRY OUT THE TESTS<br>ESC TO CONTINUE | — 145 |

| STORE NEW PARAMETERS<br>ENT TO STORE<br>ESC TO CONTINUE | — 146 |

| PASSWORD<br>ESC TO CONTINUE<br>ENT TO CHANGE PASSWORD | — 147 |

| DISPLAY THE LAST CHANGES OF THE REMOTE UNIT CODE<br>ENT: DISPLAY<br>ESC: EXIT FROM PROGRAM | — 148 |

Fig. 20A

PARAMETERS OF WELDING PASSES

PASS: NO. 1

SWITCH 111: SET TO PASS NO. 1

ESC TO CONTINUE
ENT TO DISPLAY PARAMETERS

PASS NO. 1

CARRIAGE SPEED: XXX

USE THE ARROWS TO EXIT

OSCILLATION
FREQUENCY: XXX

ANGLE OF OSCILLATION: XXX

STOP TIME AT THE LIMITS: XXX

SPEED OF WELDING WIRE: XXX

ARE DELAY: XXX

DIRECTION OF CARRIAGE
ADVANCE= XXX

Fig. 20B

DATA PROCESSING MENU.

DO YOU WANT TO SEND THE DATA TO THE WELDING MACHINE PROCESSING UNIT ?

ESC = TO CONTINUE

ENTER = YES

---

ARE YOU SURE?

ESC=NO

ENT=YES

---

DATA PROCESSING MENU.

DO YOU WANT TO RECEIVE THE PARAMETERS STORED IN THE WELDING MACHINE PROCESSING UNIT ?

ESC=NO    ENTER =YES

---

ARE YOU SURE?

ESC=NO

ENT=YES

Fig. 20C

```
ERROR DISPLAY

1)   ERROR/MALFUNCTION
     OF COMPONENT XXXX

ESC=TO EXIT
```

Fig. 20D

```
TEST

1) TORCH OSCILLATION

ESC= EXIT

ENT =TEST
```

```
OSCILLATION TEST:

THE POTENTIOMETER IS
NOT CONNECTED TO THE
CENTRAL CONTROL UNIT

ESC=EXIT
```

```
TEST

2) CARRIAGE MOVEMENT

ESC= EXIT

ENT =TEST
```

```
CARRIAGE MOVEMENT
TEST

THE MOTOR IS NOT
RUNNING

ESC= EXIT
```

```
TEST

3) WIRE

ESC= EXIT

ENT =TEST
```

```
WIRE TEST

THE ENCODER IS NOT
CONNECTED TO THE
CENTRAL UNIT

ESC= EXIT
```

```
TEST

N) XXXX

ESC= EXIT

ENT =TEST
```

```
TEST XXX

A B C D E F

ESC= EXIT
```

Fig. 20E

PARAMETER SETTING FOR WELDING PASSES

ENTER THE SECRET CODE: XXXX

ESC= TO EXIT

ENT = TO CONTINUE

---

SELECT THE PASS YOU WISH TO STORE:

PASS=X

ESC= TO EXIT

ENT = TO CONTINUE

---

CARRIAGE SPEED: SELECT WITH THE ARROWS

ESC= TO EXIT; ENT = TO CONTINUE

---

CARRIAGE SPEED 012.00 INCHES (CM)/MINUTE

ESC= TO EXIT

ENT = TO CONTINUE

---

FREQUENCY OF OSCILLATION:

SELECT WITH THE ARROWS

ESC= TO EXIT

ENT = TO CONTINUE

---

NUMBER OF OSCILLATIONS 10.00 OSCILLATIONS PER INCH (CM):
ESC= TO EXIT
ENT = TO CONTINUE

---

AMPLITUDE OF OSCILLATION

SELECT:
ESC= TO EXIT
ENT = TO CONTINUE

---

AMPLITUDE TOWARDS THE MACHINE

USE THE +/- KEYS TO MOVE THE TORCH TOWARDS OR AWAY FROM THE MACHINE. STOP THE TORCH AT THE DESIRED POSITION.

ESC = TO EXIT

ENT = TO CONTINUE

MOBILE DEVICE FOR AUTOMATIC PIPE WELDING

The present invention relates to a device for butt welding pipes. In the present context, the term "oscillation frequency" denotes the number of oscillations of the torch in a predetermined linear unit of movement (for example, one inch) of the carriage along the guide strip.

In known devices of the type mentioned above, the movement means capable of imparting an oscillatory motion to the welding torch are of the type comprising an electric motor connected to a cam, or a pneumatic piston; both of these solutions present problems.

As is known to persons skilled in the art, in order to carry out the butt welding of two pipes it is necessary to make numerous welding passes, during which a plurality of superimposed layers of weld material are deposited in the groove delimited by the two joined ends to be welded.

In some of these welding passes it is preferable to impart an oscillation to the welding torch, in such a way as to distribute the weld material uniformly in the groove when the distance between the walls of the groove varies.

In the known devices having torch moving means of the cam type, the position of the cam has to be regulated for each type of pass. The operations for regulating the position of the cam are relatively lengthy and complicated, and, if they are not carried out in a very accurate way, cause irregularities in the welds.

Numerous problems are also present in devices in which the oscillatory movements are produced by a pneumatic piston. In the first place, the system is bulky, and requires a relatively complicated pneumatic circuit and a dedicated control unit. Furthermore, the carriage has to be connected by a tube to a source of compressed air. The regulation of the amplitude and frequency of oscillation takes place manually by the operation, respectively, of a handle connected to a screw capable of limiting the movement of the torch and a vent valve of the piston.

In these devices also, for each welding pass it is necessary to carry out a relatively lengthy and complicated operation of manual regulation of the oscillation means, which must be carried out with great accuracy. For these reasons, machines with these forms of regulation of the oscillation characteristics of the torch are normally regulated to carry out one type of pass, and continue to be used subsequently to execute this specific pass. This means that it is necessary to have a number of machines to complete one weld.

The object of the present invention is to provide a device for butt welding pipes, which makes it possible to regulate in a simple, fast and reliable way the frequency and amplitude of oscillation and the speed of oscillation of a welding torch, and which is capable of ensuring constant conformity with the aforesaid parameters once they have been set.

A further object is that of providing a device which makes it possible to regulate the characteristic values of the oscillation of the welding torch in accordance with the speed of travel of the device on the guide strip.

A further object is that of providing a device in which the means for oscillating the torch and for controlling this oscillation are compact and easily assembled.

A further object is that of providing a device which does not require manual regulation of the oscillation means during the various welding passes.

A further object is that of providing a device which makes it possible to start and finish the welding with the welding torch in a predetermined position with respect to the center of the weld.

A further object is that of providing a device which makes it possible to carry out welding with non-symmetrical oscillation of the torch.

A further object is that of providing a device which makes it possible to vary the stop times of the torch at the limits of the oscillation so that welds can be carried out with a distribution of the weld material having a particular geometrical form, for example flat, concave, convex or undulating.

A further object is that of providing a device in which the operator can manually vary the speed of travel of the carriage along the guide by a certain percentage, and in which the parameters of the oscillation of the welding torch are automatically matched to these variations of the speed of travel of the carriage.

These and other objects which will be clear to those skilled in the art are achieved with a device according to the attached claims.

For a clearer understanding of the present invention, we attach by way of example, but without restriction, drawings in which:

FIG. 5A is a schematic cross-sectional view of a detail of these means;

Figure 12A:
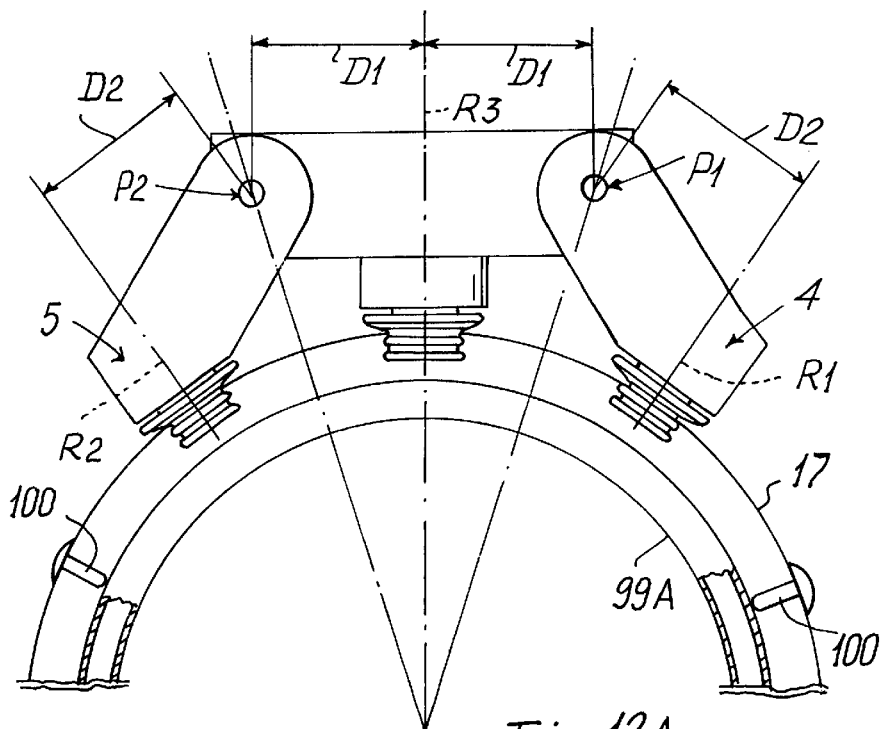
Figure 13:
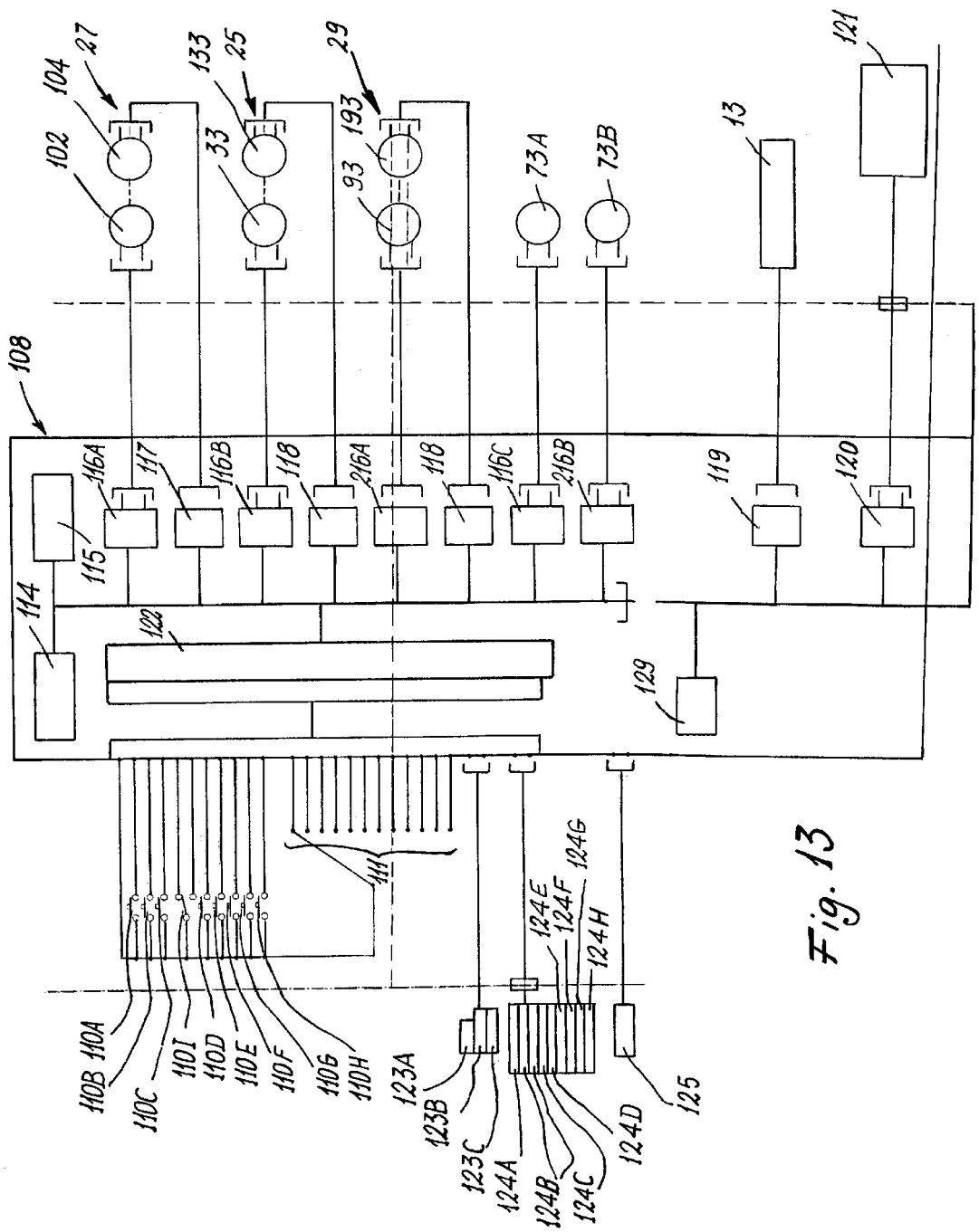
Figure 14:
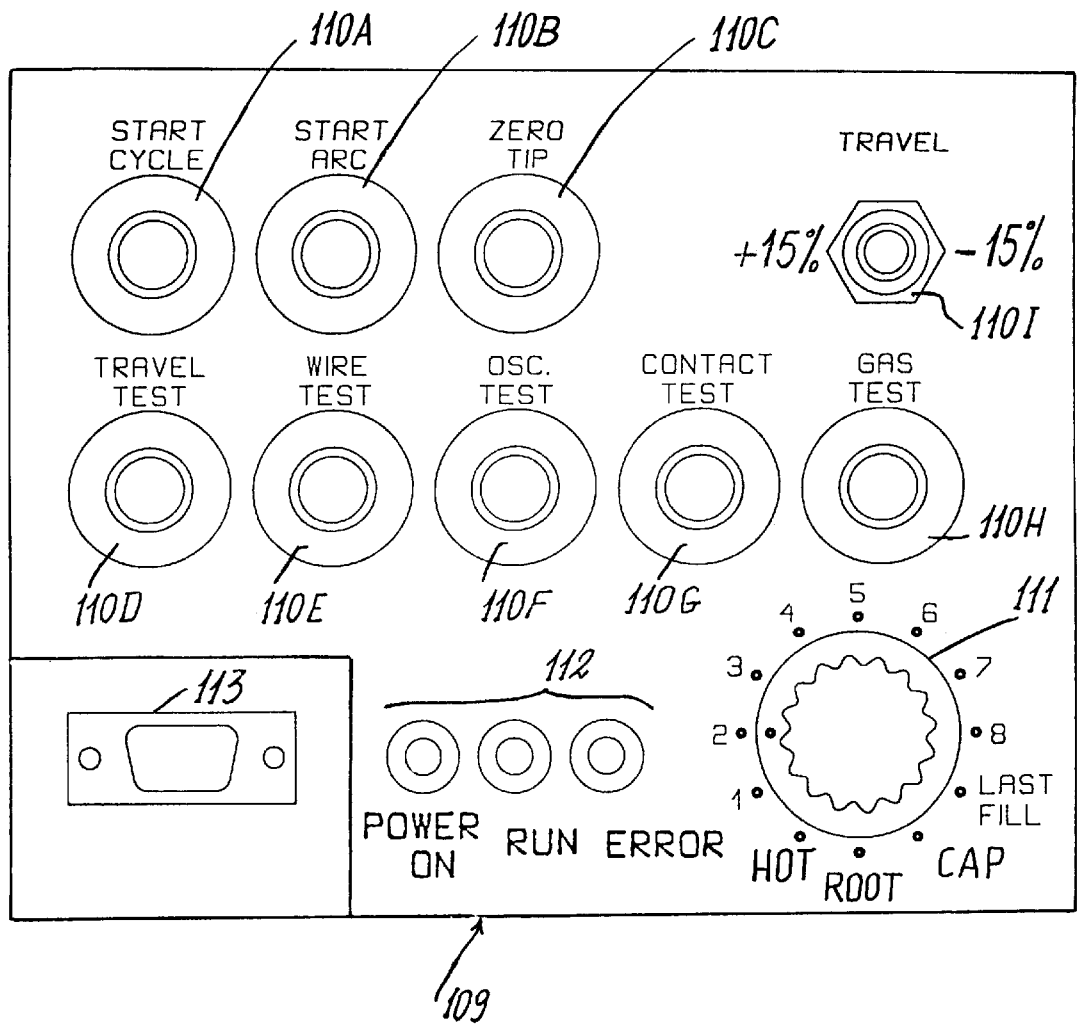
Figure 15:
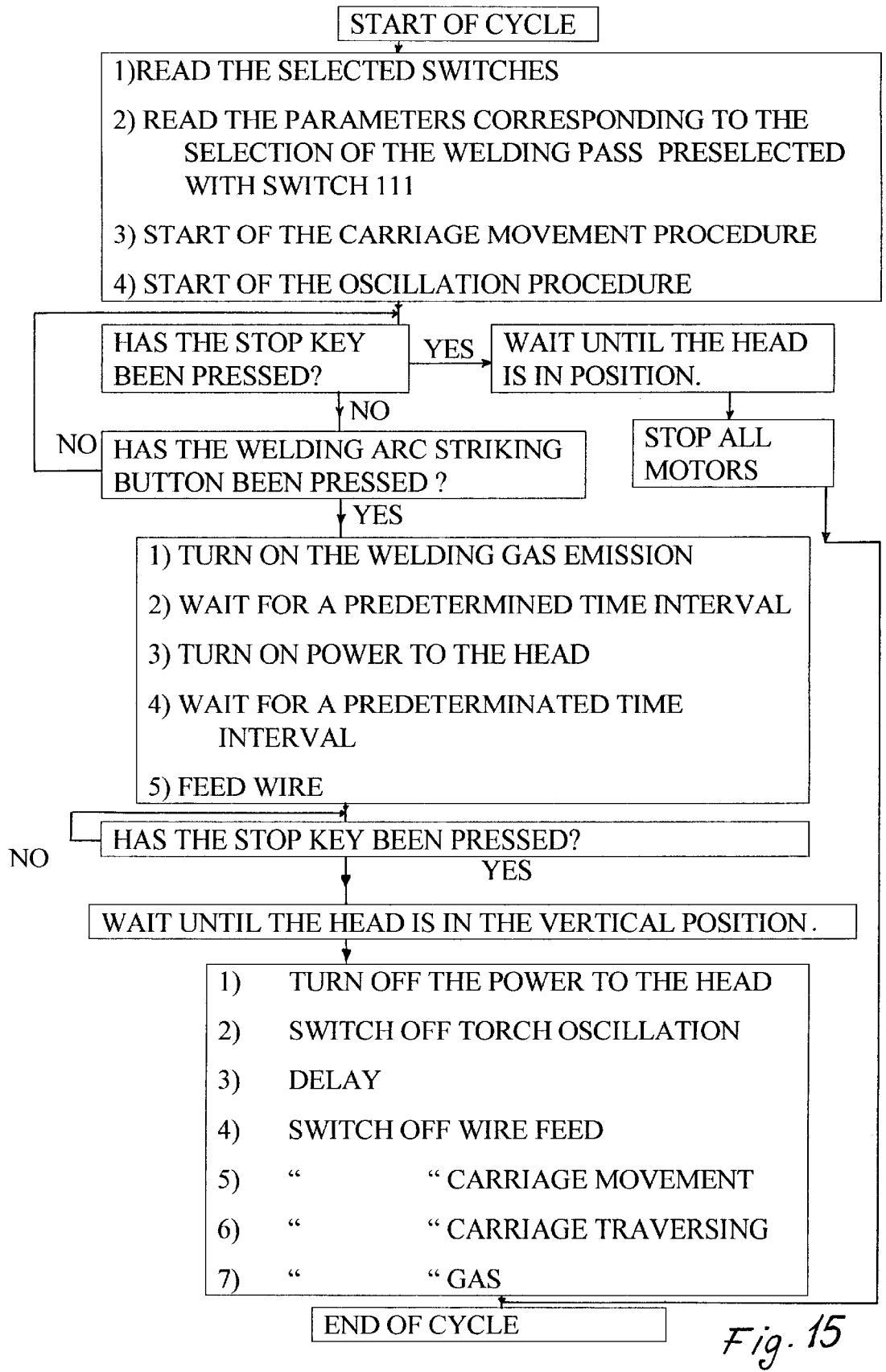
Figure 16:
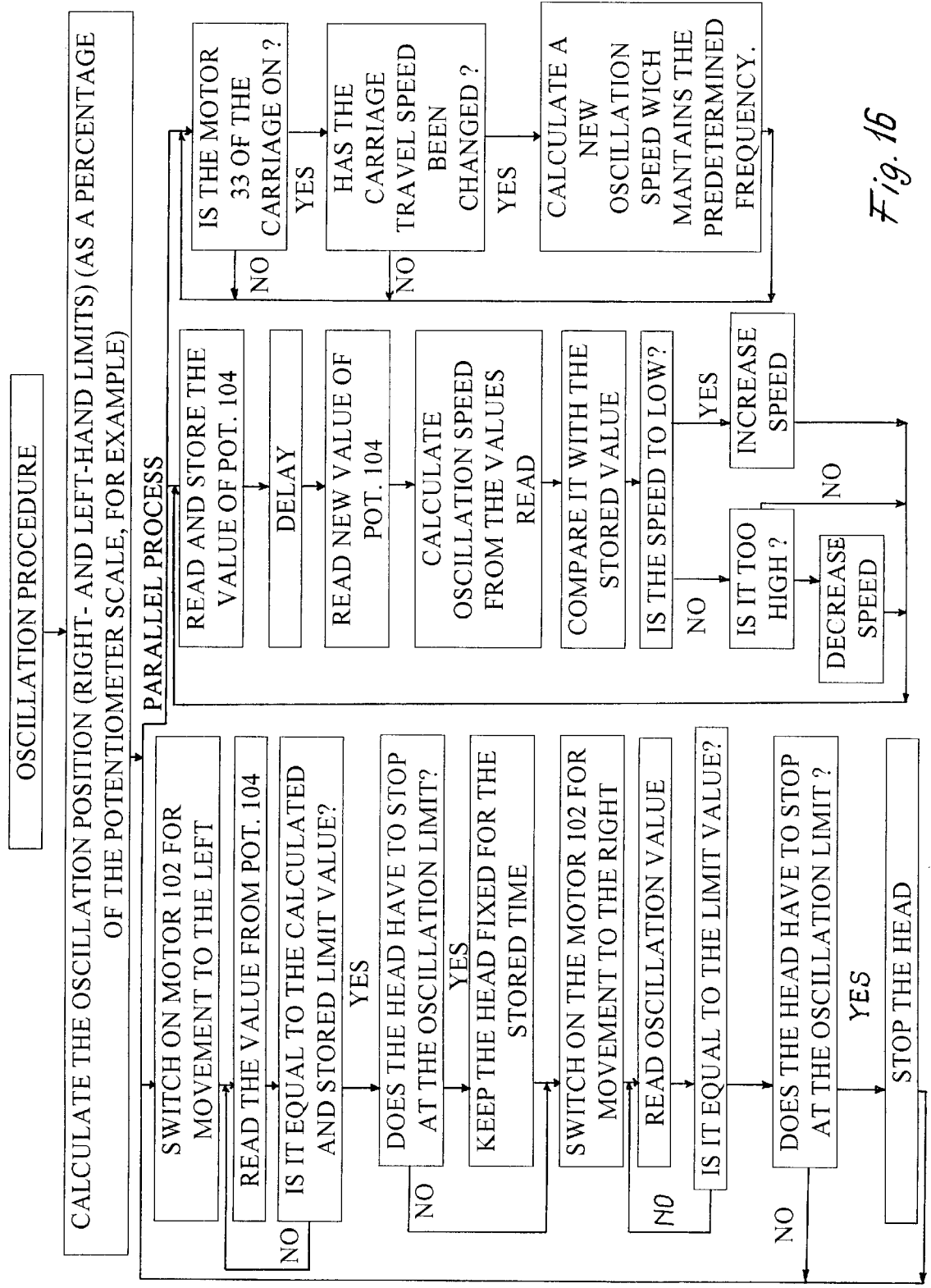
Figure 17:
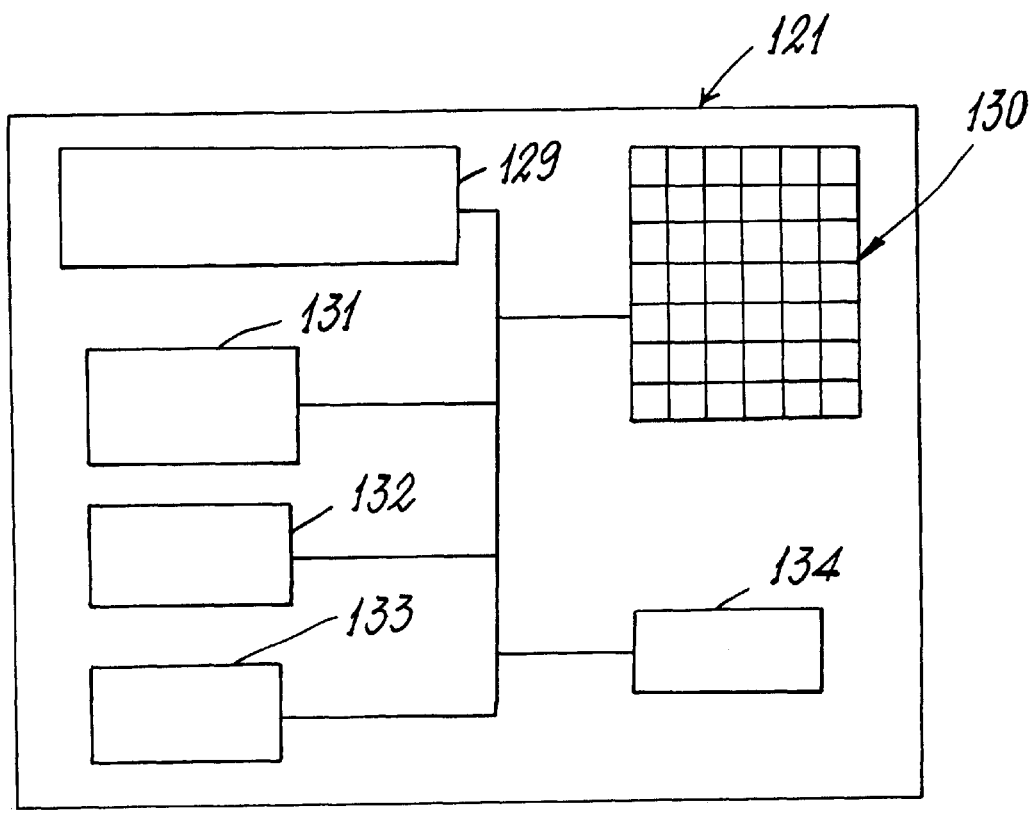
Figure 18:
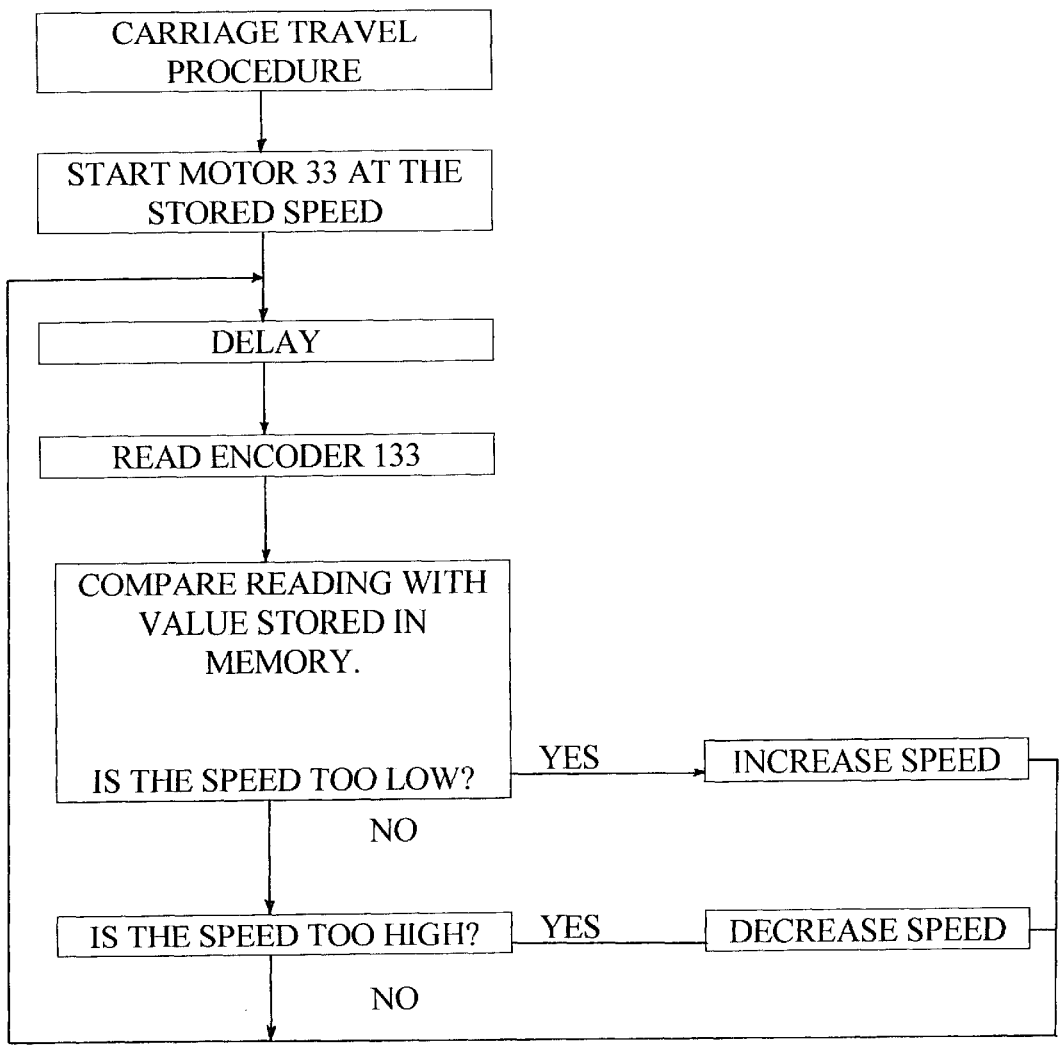
Figure 19:
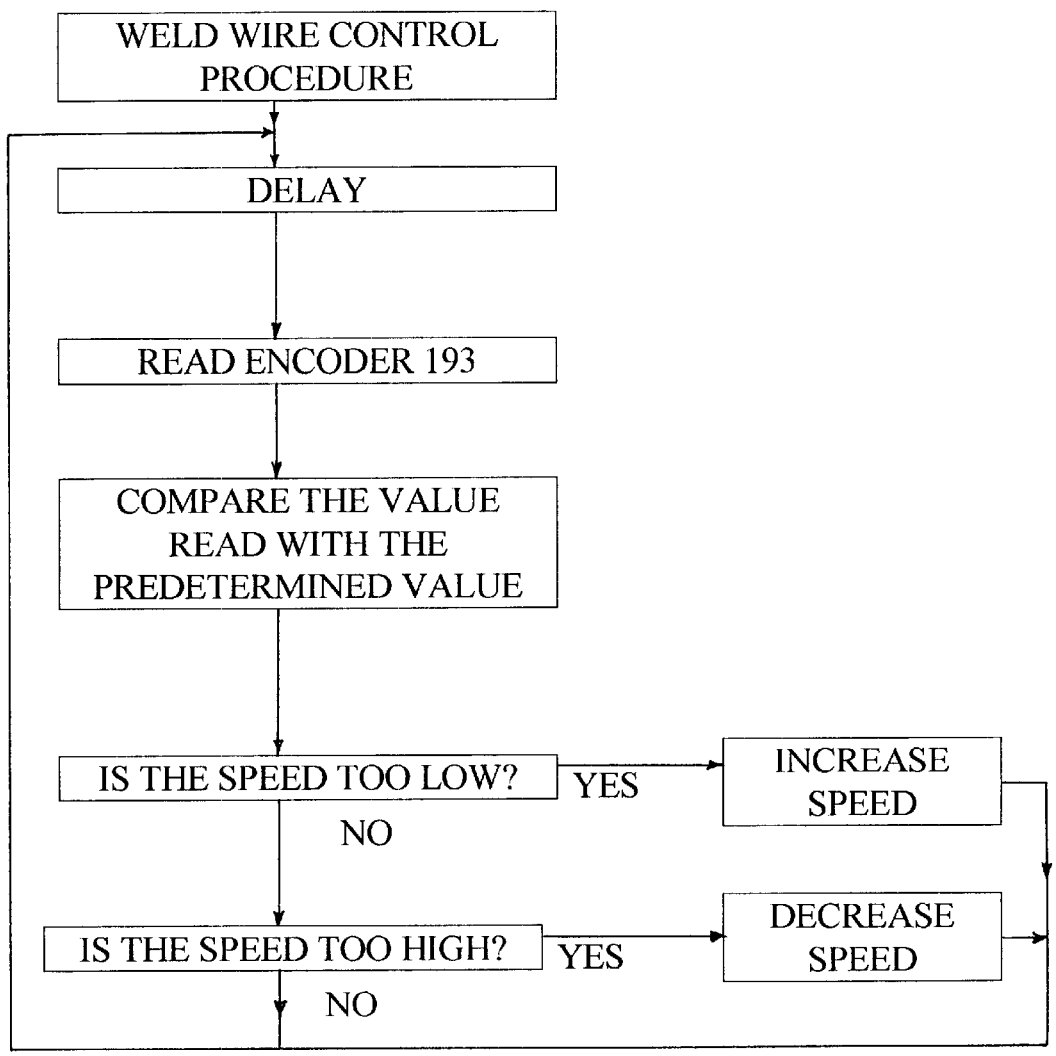
Figure 20G:
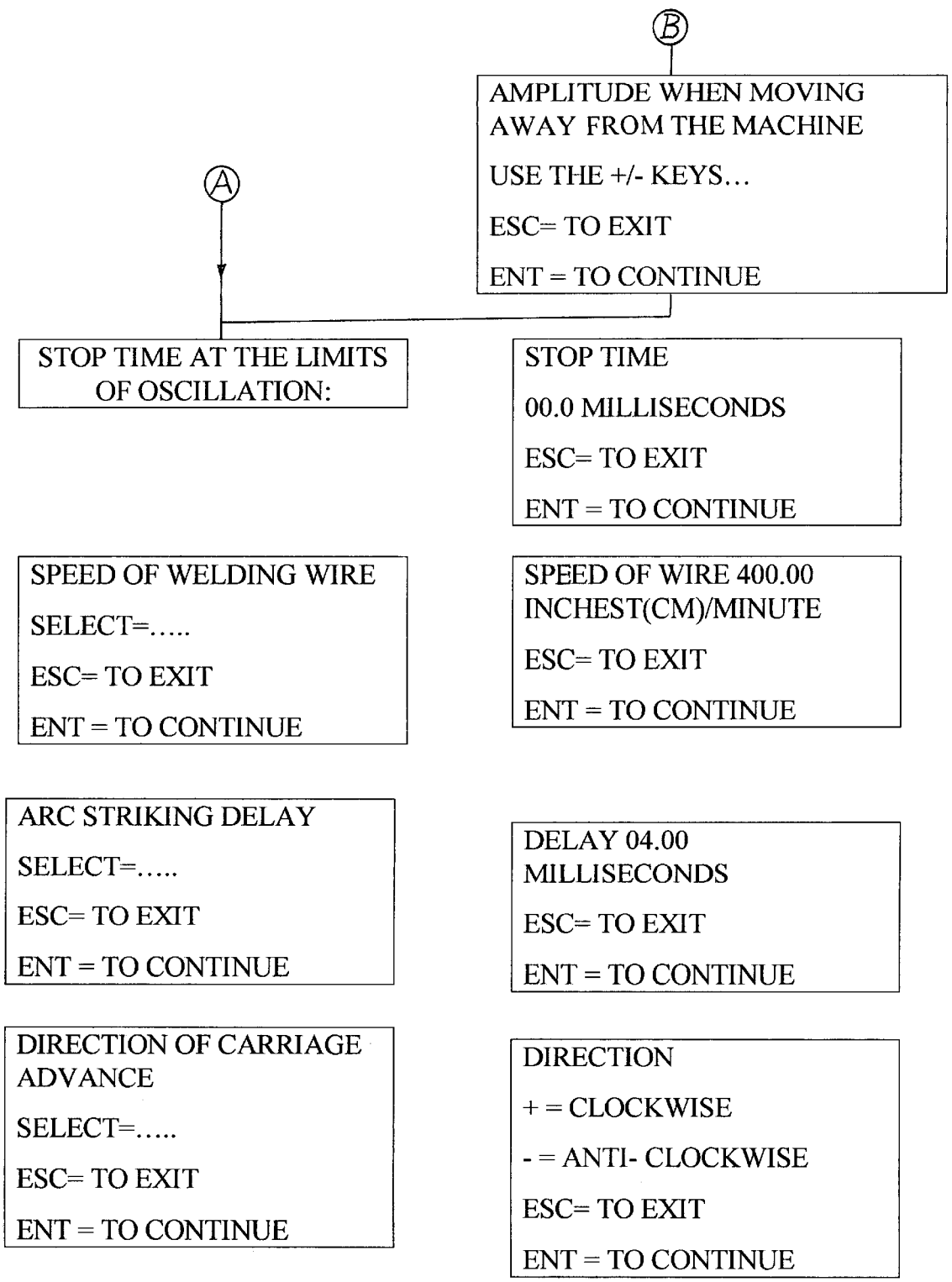

FIGS. 12A, B, C show a schematic side view of the carriage in different operating positions;

FIG. 13 shows a circuit diagram of a control unit of the device;

FIG. 14 is a view of the interface of the control unit;

FIGS. 15 and 16 show two first block diagrams of this unit;

FIG. 17 is a circuit diagram of a programming unit;

FIGS. 18 and 19 are a third and fourth block diagram of the control unit of the device;

FIGS. 20A, B, C, D, E, F, G is show screens by means of which it is possible to interact with a remote unit of the device.

Figure 1:
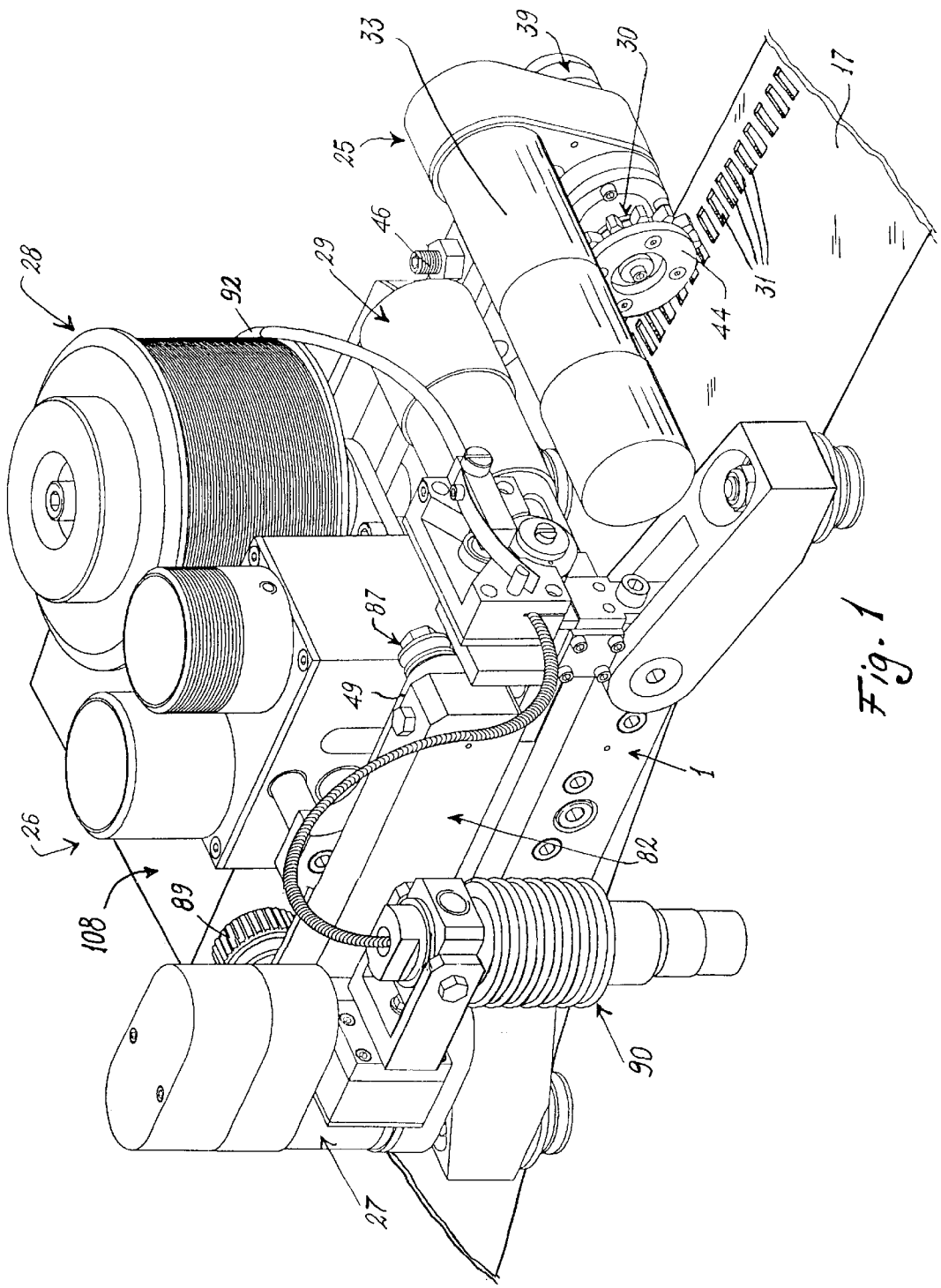
FIG. 1 is a schematic perspective view of a device according to the invention.

With reference to the cited figures, and particularly to FIG. 1, a device according to the invention comprises a carriage 1 which moves along a guide strip 17 and carries powered means 25 capable of moving the carriage along the strip 17, means 26 capable of vertically and horizontally moving a supporting element 49, 82 for means 27 capable of moving a conventional welding torch 90 in an oscillatory way, means 29 for feeding a filler wire unwound from a reel 28 and fed to the torch 90, and a control unit 108 of the device.

The carriage 1 comprises a supporting structure or main body 2 to which are hinged two movable arms 3, 4 and three rolling means 5, 6, 7 connected, respectively, to the ends of the arms 3, 4 and to the main body 2. The main body 2 comprises two parts 8, 9 movable in a coplanar way in opposition to elastic means 10 (FIG. 3) which, in normal conditions, keep the opposing faces 8A, 9A (FIG. 3) of the two parts 8, 9 in contact with each other.

The two parts 8, 9 are connected together by two bars 11 whose ends 11A are fixed to the part 9 by bolts 12 and whose remaining parts 11B can slide in seats 13 formed in the part 8. Sliding bearings 14 are provided to facilitate sliding in the seats 12.

The elastic means 10 comprise a conventional spring 15, passing through a seat 16A, B formed in the part 8, whose ends bear against the head of a screw 17A which passes through the spring, and against a stop formed on the side 8A of the part 8.

The end of the screw 17A is engaged in a threaded seat 16B provided in the part 9 and can slide together with the spring 15 in the seat 16A of the part 8. The elastic force which presses the part 9 against the part 8 can be regulated by tightening or slackening the screw 17.

It should be noted that, owing to the elastic means 10, the two parts 8 and 9 of the carriage, to which rolling means 5, 6, 7 are connected, are connected together in an elastic way. Owing to this characteristic, the carriage is not affected by any irregularities in the width L (FIG. 2) of the guide strip on which the carriage runs.

The outer edge of the part 9 has a handle 18BIS; by acting on this in opposition to the force exerted by the elastic means 10, it is possible to move the parts 8 and 9 away from each other, thus enabling the carriage to be attached to or removed from the strip 17.

The outer edge of the part 9 has a bar 18 which, as well as closing the seats 13, is capable of supporting at its ends the two identical arms 3 and 4. These arms are hinged at P1 and P2 (FIGS. 12A–C) to the ends of the bar 18, by means of conventional screws and bolts 19. To enable the rolling means 5, 6, 7 to be associated with the guide strip 17 regardless of the radius of curvature of the latter, the arms 4 and 5 and the bar 18 are shaped in such a way that the distances D1. between the central axis A (FIG. 2) of the carriage and the hinging points P1 and P2 and the distances D2 between these points and the axes of rotation R1, R2 of the rolling means 5 and 6 provided at the ends of the arms 4 and 5 are identical (see FIGS. 12A–C). When the distances D1., D2 are specified in such a way that they are equal, and when the third rolling means is positioned in such a way that its rolling axis R3 is perpendicular to the central axis A of the main body 2 and in such a way that the three rolling means 5, 6, 7 are coplanar with each other in an operating position of the carriage (FIG. 12C), the carriage can used either with flat guide strips (FIG. 12C) or with guide strips having a marked curvature (FIG. 12A), in other words a small radius, or with strips having a limited curvature, in other words a large radius (FIG. 12B).

Each of the rolling means 5, 6, 7 comprises a conventional roller 20 A, B, C, of the double-rim type, capable of rotating along the edge of the strip 17, and connected by means of a pin 24, a bolt 21 and a pair of conventional bearings 22 to the end of the arm 3 or 4 or to the part 9 of the main body 2 of the carriage. For this last connection, a spacing element 23 is used, and is rigidly fixed to the lower face of the part 9 and is capable of spacing the roller 20C from the part 9 in such a way that, in an operating position (FIG. 12C), the three rollers 20A–C are coplanar with each other, or in other words the three corresponding axes of rotation R1–R3 are all perpendicular to the same plane.

Figure 12B:
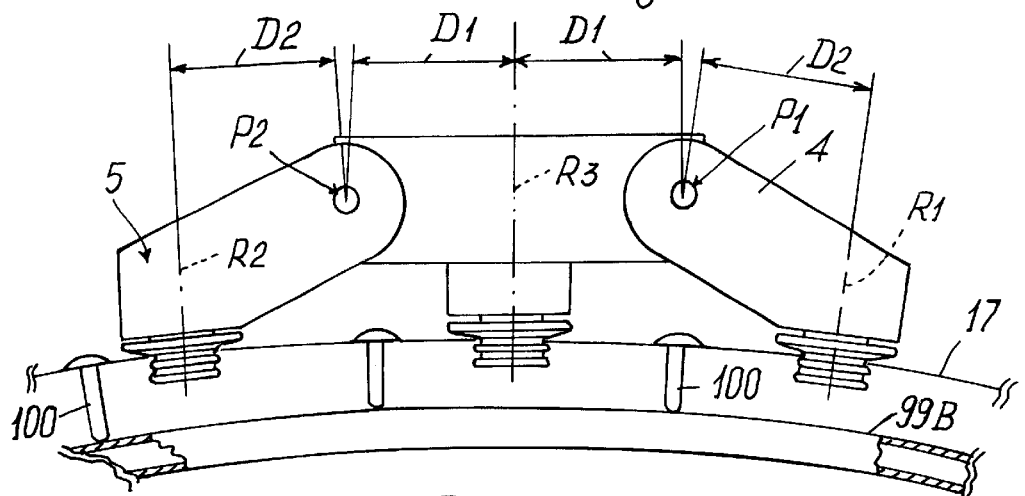
Figure 12C:
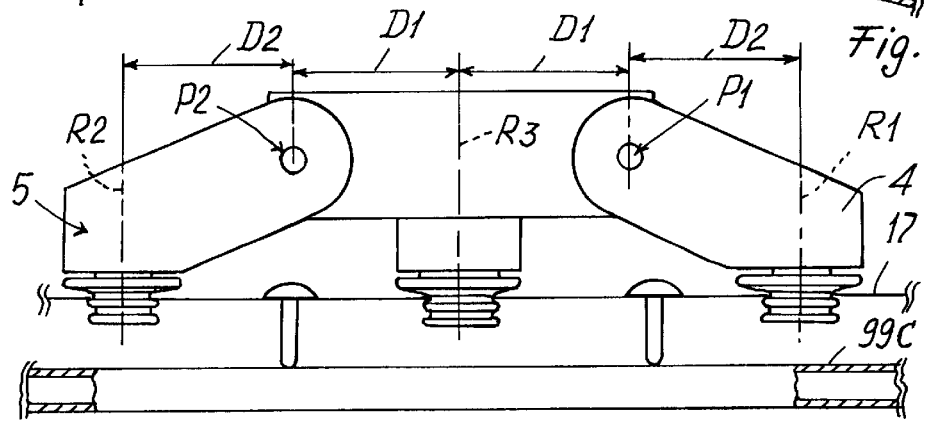

To use the carriage described up to this point, it is first necessary to fix the guide strip 17 to the workpiece which, as shown in FIGS. 12A–C, may, for example, be a pipe 99A with high curvature (limited radius), or a pipe 99B with limited curvature (large radius), or a flat piece 99C. The strip is fixed to the workpiece in a conventional way and is kept at a certain distance from the outer surface of the piece by spacers 100, also of a conventional type. When the strip 17 has been fixed, the carriage is attached to it; to do this it is simply necessary to place the carriage on the strip, ensuring that the two rollers 20A, B engage with one of the edges of the strip, after which the handle 18BIS is pulled in such a way that the third roller 20C can also engage with the other edge of the strip 17. At this point the handle is released and the carriage is then ready for use. It should be noted that the operation of connecting the carriage to the strip is extremely simple and fast, and does not require the operation of any lever mechanism or locking device.

Figure 2:
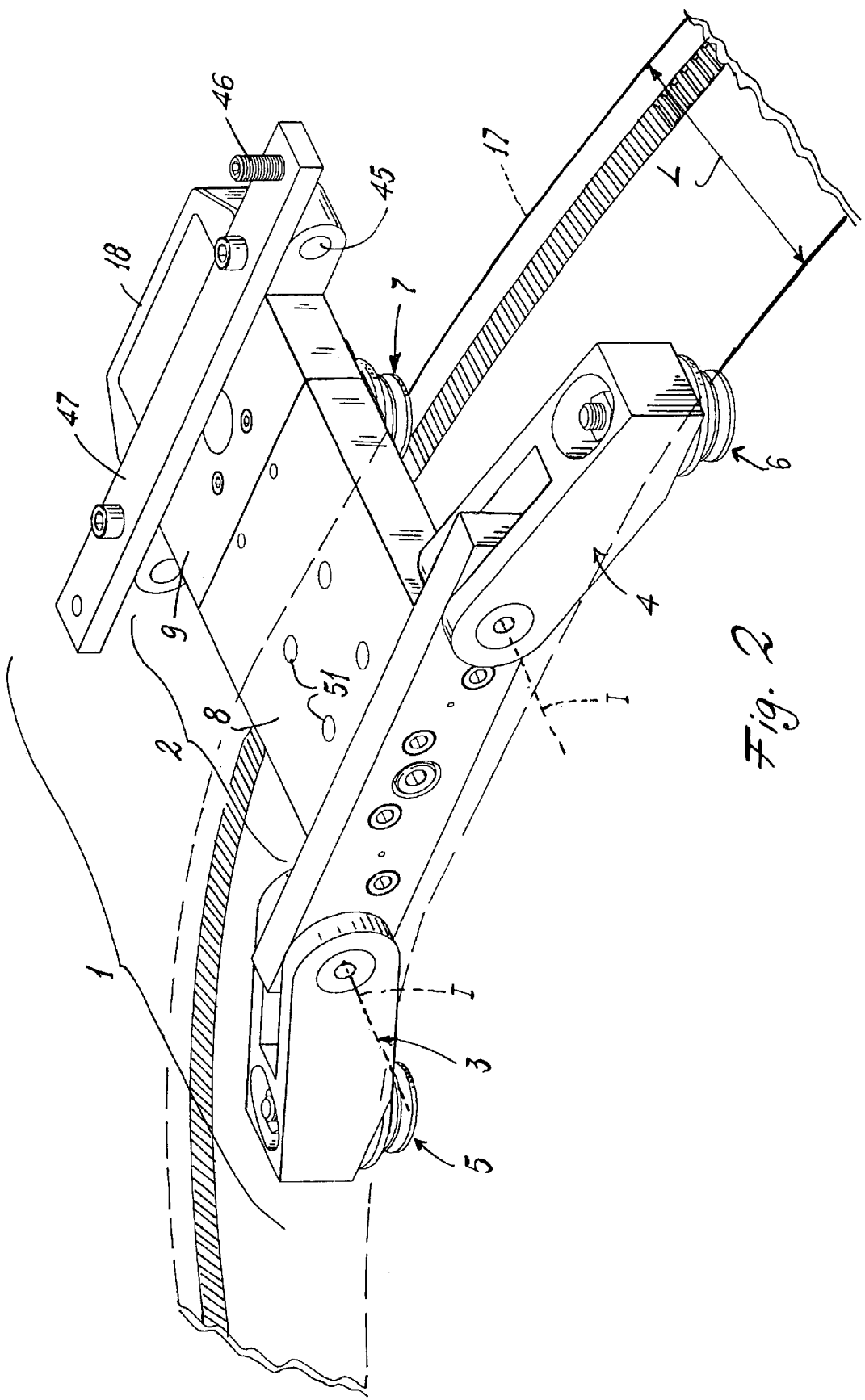
FIG. 2 is a schematic perspective view of the carriage of the device according to the invention.

The operations required to adapt the carriage to a strip 17 with a different curvature are also extremely simple; in fact it is simply necessary to unscrew the two screws 19 on which the arms 3 and 4 are hinged to the carriage. To facilitate these operations, reference marks 101 may be made on the bar 18 (FIG. 2). In this case also, the fact that the position of only two rollers has to be regulated simplifies the operation and makes it extremely fast.

Figure 5:
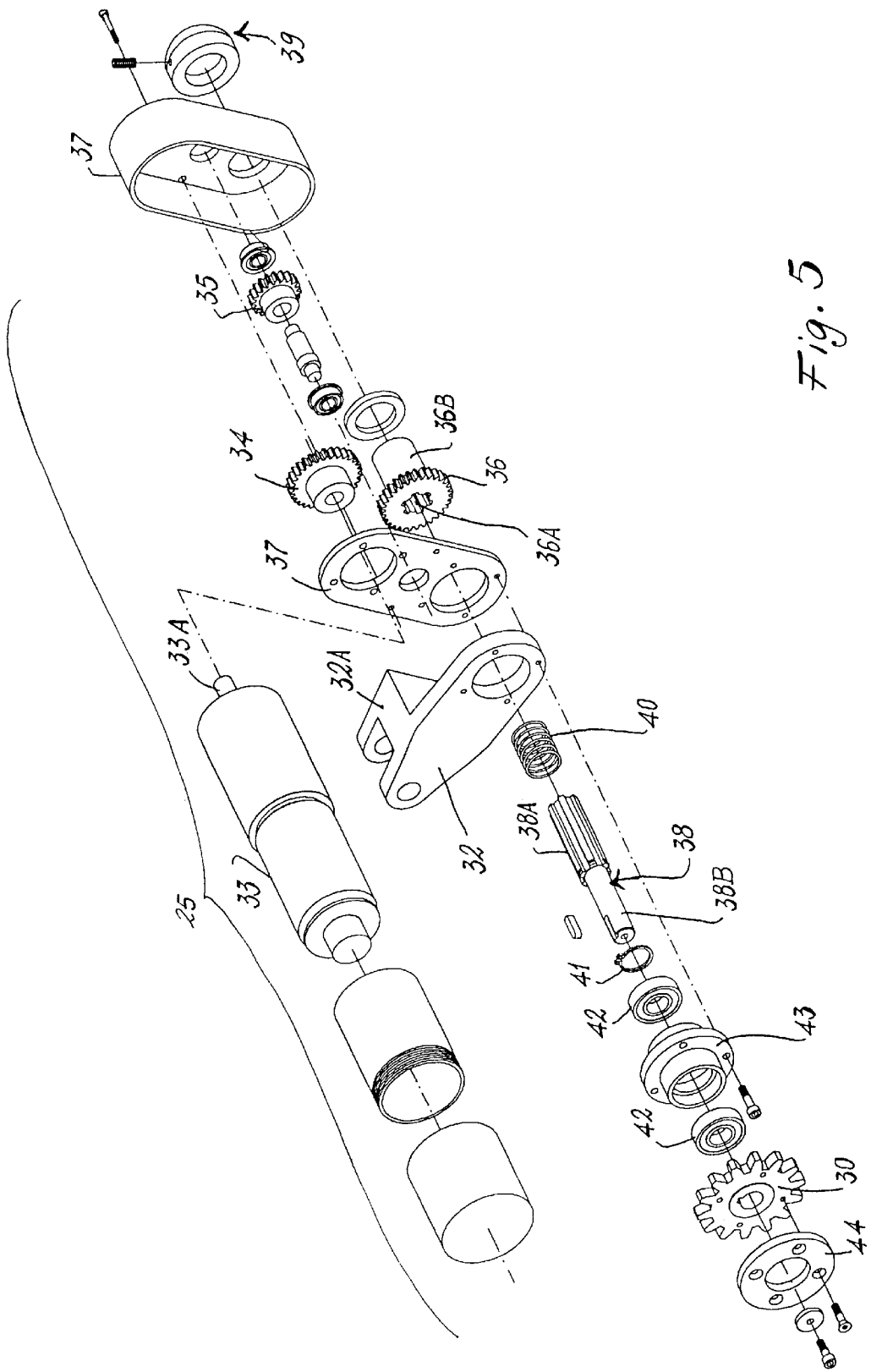
FIG. 5 is an exploded view of these means.

The means of movement 25 are of the rack type, and comprise a pinion 30 capable of engaging in the apertures 31 of a rack formed in the strip 17 (FIG. 1). More particularly (FIG. 5), the means 25 comprise an element 32 connected to the part 9 of the carriage, and carrying in turn a gearbox 37 housing a conventional geared motor unit 33, whose shaft 32A is connected first gear wheel 34 which is connected through an intermediate wheel 35 to a second gear wheel 36. The last wheel has a central hole 36A shaped in such a way that it can be connected to a shaft 38, such that the wheel 36 can transmit the rotary motion to this shaft, but can also slide longitudinally on the shaft (as will be explained subsequently).

The shaft 38 has a grooved portion 38A along which the wheel 36A can slide, and a smooth portion of smaller diameter 38B. A spring 40 is fitted on to the shaft 38 and bears on the wheel 36 and on a circlip 41 rigidly connected to the shaft 38.

The smooth part 38B of the shaft 38 is supported by a pair of conventional bearings 42 housed in an element 43 fixed to the support 32; the shaft 38 is also fixed rigidly to the pinion 30 to which is also fixed a smooth coaxial ring 44 having a diameter equal to the pitch diameter of the pinion 30.

The connecting element 32 is symmetrical about its longitudinal axis and has an upper base surface 32A identical to the lower one (not shown), so that it can be attached to either end of part 9 of the carriage (as will be shown subsequently).

The geared motor unit 33 comprises a conventional direct-current motor and a reduction unit having a high reduction ratio in excess of 1/400. Thus it is possible to make use of all the speeds of the motor and the "dropping" of the carriage towards the lower position of the guide strip is prevented when the motor is switched off.

Because of the sliding connection of the wheel 36 to the shaft 38, the shaft can be disconnected from the geared motor unit. This is because the wheel 36 has, for this purpose, a coaxial pin 36B, also pierced in the same way as the wheel 36, and projecting to a certain extent from an opening in the box 37. A knob 39 is provided on the free end of the pin 36b. By exerting a force F (FIG. 5A), which opposes that of the spring 40, on the knob 39, the wheel 36 can be moved towards the pinion 30 and thus disengage the teeth of the wheels 35 and 36, thus making the pinion 30 idle. In this way, the carriage can be moved manually along the guide strip by continuing to hold in the knob 39 and pushing the carriage. When the knob 39 is released, the wheel 36 returns automatically, under the action of the spring 40, to a position of engagement with the wheel 35, and the carriage is locked in its current position by the geared motor unit 33, which is switched off. To enable the knob 39 to be held in more easily during the movement of the carriage, the knob 39 is advantageously made in two parts (FIG. 5A), a first part 39A rigidly connected to the free end of the pin 36B and the other part 39B connected to the first in such away as to be free to rotate coaxially with the pin 36B.

The element 32 is connected to the part 9 of the carriage by a screw and a bolt which engage in a through hole 45 made at one end of the moving part 9. This part also has a screw 46 passing through a threaded hole made in a bar 47 rigidly connected to the part 9 of the carriage. The head of the screw 46 bears against the upper base 32A (FIG. 5) of the connecting element 32 and is regulated so that it acts as a limiting device for the element 32 and prevents the pinion 30 from lifting off the rack during the operation of the carriage or its manual movement.

It should be noted that the screw 46 is regulated in such a way that the ring 44 rests on the guide strip, so that the presence of the ring 44 ensures that the pinion 30 always rotates on its pitch diameter.

Figure 3:
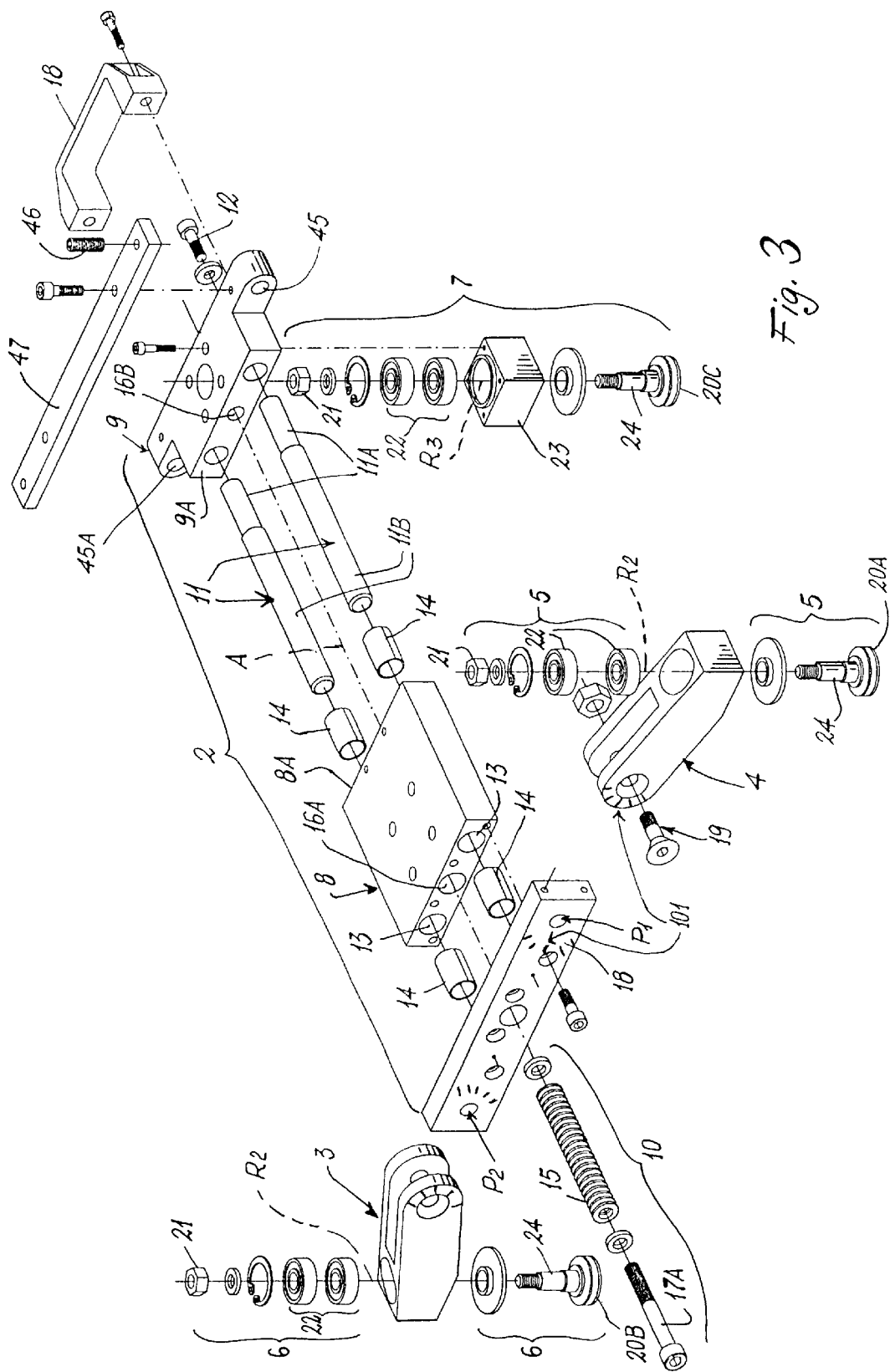
FIG. 3 is an exploded schematic perspective view of the carriage.
Figure 4:
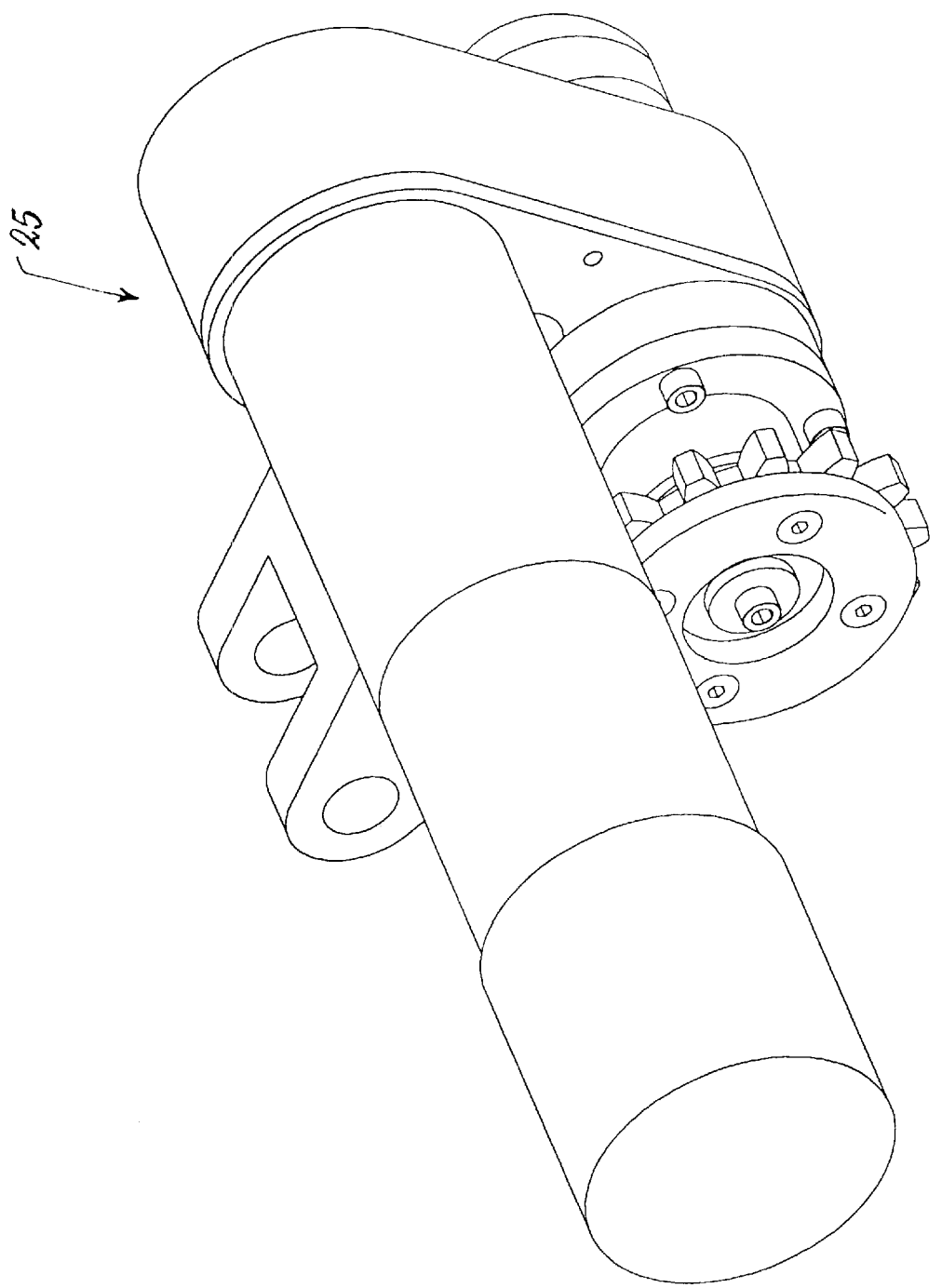
FIG. 4 is a schematic perspective view of the means of movement.

If the carriage shown in FIG. 3, which is a carriage for right-hand or clockwise movement, is to be converted into a carriage for left-hand or anti-clockwise movement, it is simply necessary to unscrew the screw which connects the means of movement 25 and to screw these means into the other hole 45A made in the part 9 (FIG. 3) in a position symmetrical to that of the hole 45. Before connecting the means 25, the box 37 must also be unscrewed from the element 32 and rotated through 180°, other words the surface 32A must be made to become the lower surface of the element, which is then ready for connection to the part 9.

The means of movement 25 also comprise a conventional sensor, for example an encoder 33 (FIG. 3) capable of supplying to a fixed control unit 108 of the device a signal relating to the movement of the carriage 1 along the guide.

The means 26 for moving the working device 27 horizontally and vertically comprise a base 48, capable of being fixed rigidly to the part 8 of the carriage, and a box-shaped body 5 connected to the base and to a bar 49 for the connection of a working device. The part 8 has two through holes 51 (FIG. 2) for the passage of two screws (not shown) which can engage in two threaded holes 51A (FIG. 7) provided in the base 48. From the base 48 there extend perpendicularly two guide pins 52 rigidly connected to the base by the screws 52A, and a central pin 53 which is also rigidly connected to the base 48 and has a threaded central through hole 53A for the passage of the shank of a screw 54 to whose end 54A is connected a screw 55 with a washer which acts as a limit stop for the screw 54. Five sliding bearings 56. 57 are advantageously fitted on the guide pins 52 and the central pin 53, in such a way as to facilitate sliding when they are inserted in the corresponding apertures provided in the body 50; a conventional bearing 60 is provided on the shank of the screw 54 near its head 54B, and is connected to the screw by a circlip 60A engaging in a groove 60B of the screw.

The screw 54 has a shank whose lower half is threaded and is engaged with the central pin 53. The head 54B of the screw 54 projects from a cover 50A of the box-shaped body and is rigidly connected by a screw 61 to a rotating knob 62A. By the rotation of the knob 62 in one or other direction, the box-shaped body 50 slides along the pins 52, 53 and is thus brought closer to or moved away from the base 48.

The box-shaped body 50 comprises a second rotating knob 62B having an axis of rotation M2 parallel to the axis M1 of the other knob, and both knobs 62 are positioned at such a distance D from each other that they can be operated by one hand. One of the two knobs (62A) also has a knurling 63 on its outer surface so that it can be distinguished from the other by touch. The knob 62B transmits its motion through a conventional system of gears 64, 65, 66, 67, bearings 68, and supports 68A, 69 to a screw 67 whose axis of rotation is perpendicular to that of the knob and is connected to a central pin 70 identical to the pin 53 described above. The central pin 70, together with the two side pins 71, is rigidly fixed to a connecting bar 49 for the working device.

By rotating the knob 62B in one or other direction, the connecting bar 49 can be brought closer to or moved away from the body 50 by making the pins 70, 71 slide in sliding bearings 56 and 57 in the body 50.

Figure 11:
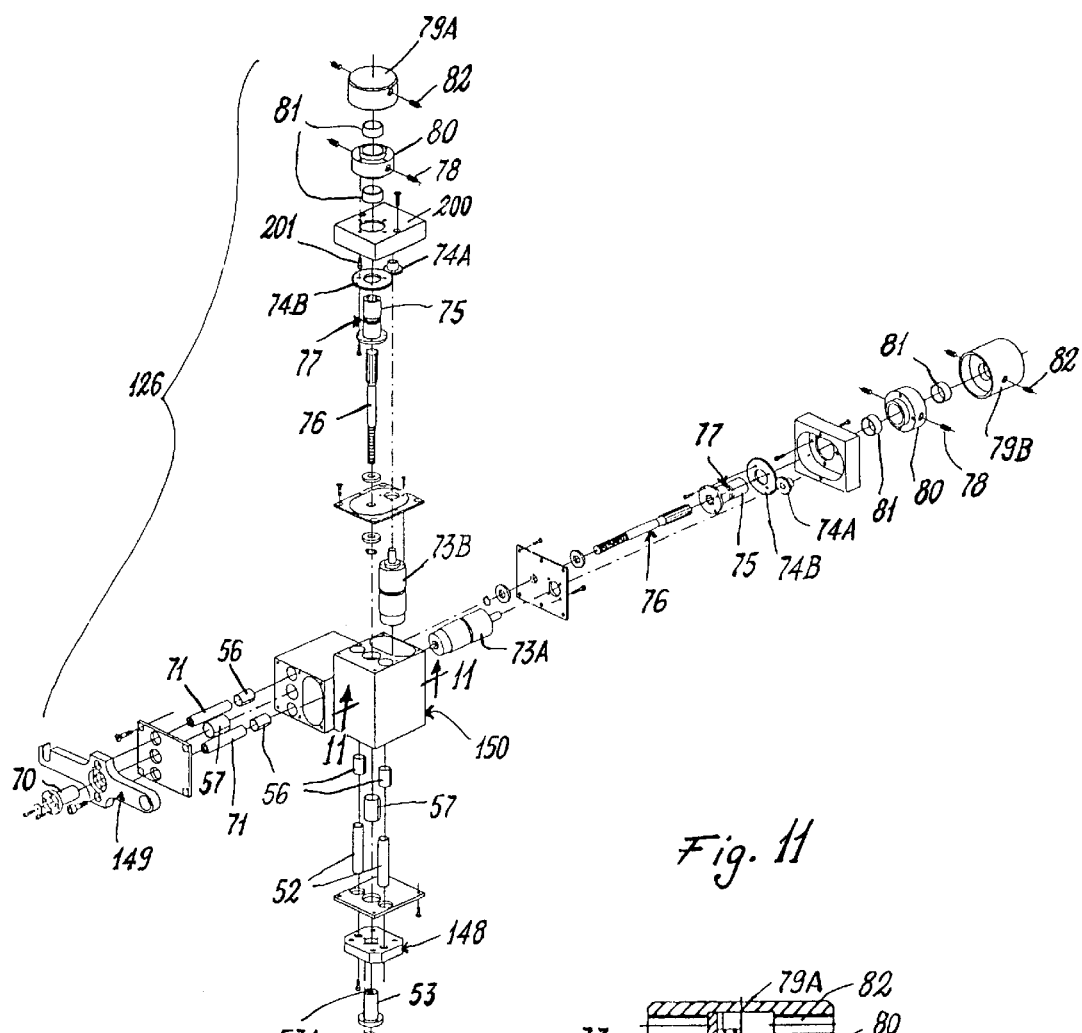
FIGS. 11 and 11A is are, respectively, an exploded schematic view and a cross-sectional view, taken in the direction of the arrow 11 in FIG. 11, of automatic and manual means for vertically and horizontally moving the working device.

It should be noted that the means 26 of moving the working device in directions perpendicular and parallel to the carriage, using the box-shaped body 50 which houses the gears for both movements of the working device, is very compact and can easily be replaced with movement means 126 (FIG. 11) which can be operated either by motors or manually. This is because the whole movement unit for the working device can be replaced simply by unscrewing the two screws which connect the base 48 to the part 8 of the carriage. The movement means 126 comprise a base 148, similar in all respects to the base 48 described above, a box-shaped body 150 capable of housing both the gears for the transmission of motion and two geared motor units 73A, B, and a bar 149 for connecting a working device (the components identical to those of the embodiment described previously are not detailed here, but are indicated in FIG. 11 by numbering identical to that used in FIG. 7).

The motor 73B is housed in a seat formed in the box-shaped body 150 and has its shaft connected to a first wheel 74A which engages with a second wheel 74B, this being rigidly connected to the flange of a pin 75 connected to a shaft 76, in such a way that it can cause the shaft to rotate but can also slide along a portion of it. The shaft 76 has a threaded end which interacts with the central pin 53A, in the same way as the screw 54 of the means described in FIG. 7. The pin 75 has two circular grooves 77 in its outer surface.

The fixed knob 79 is rigidly fixed to the upper end of the pin 75 by the screws 82. The intermediate annular element 80 is fixed to the cover 200 by screws 201 and is associated with the pin 75 by means of two pressure screws 78 with elastic ball-shaped tips which can snap into one or other of the two annular grooves 77 formed on the surface of the pin 75. Two sliding bearings 81 enable the pin 75 to rotate and slide within the intermediate element 80.

When the shaft 76 is to be moved by means of the motor 73B, the two wheels 74B and 74A engage with each other, and the pressure screws 78 of the intermediate element 80 engage with the upper annular groove of the pin 75. Conversely, when the shaft 76 is to be moved manually, the knob 79 simply has to be pulled upwards so that the two wheels 74A and B are disengaged; thus the pressure screws 78 will engage with the lower annular groove of the pin 75.

It should be noted that, owing to the particular connection of the intermediate annular element 80 to the pin 75, the movement of the knob 79 from one position to another is identified precisely by a snap-fitting movement.

Figure 11A:
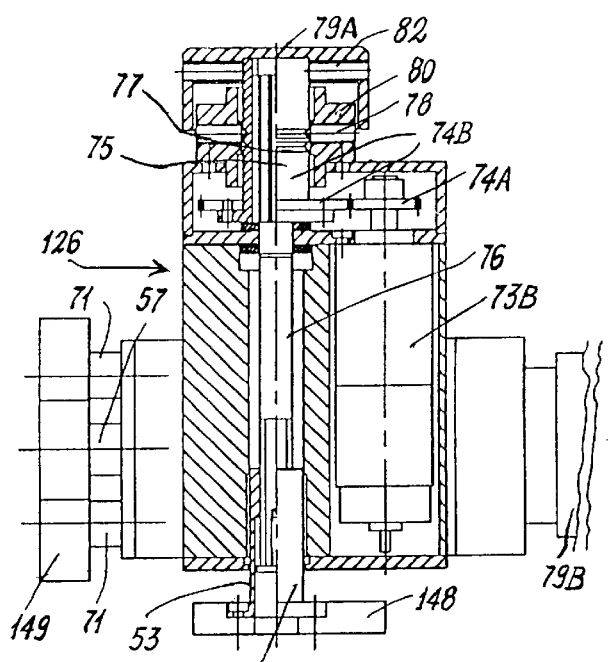

The components for moving the bar 149 horizontally are identical to those described previously for the vertical movement, and will not be described further (they are indicated in FIGS. 11, 11A with the same numbering of the components as for the vertical movements).

Figure 7:
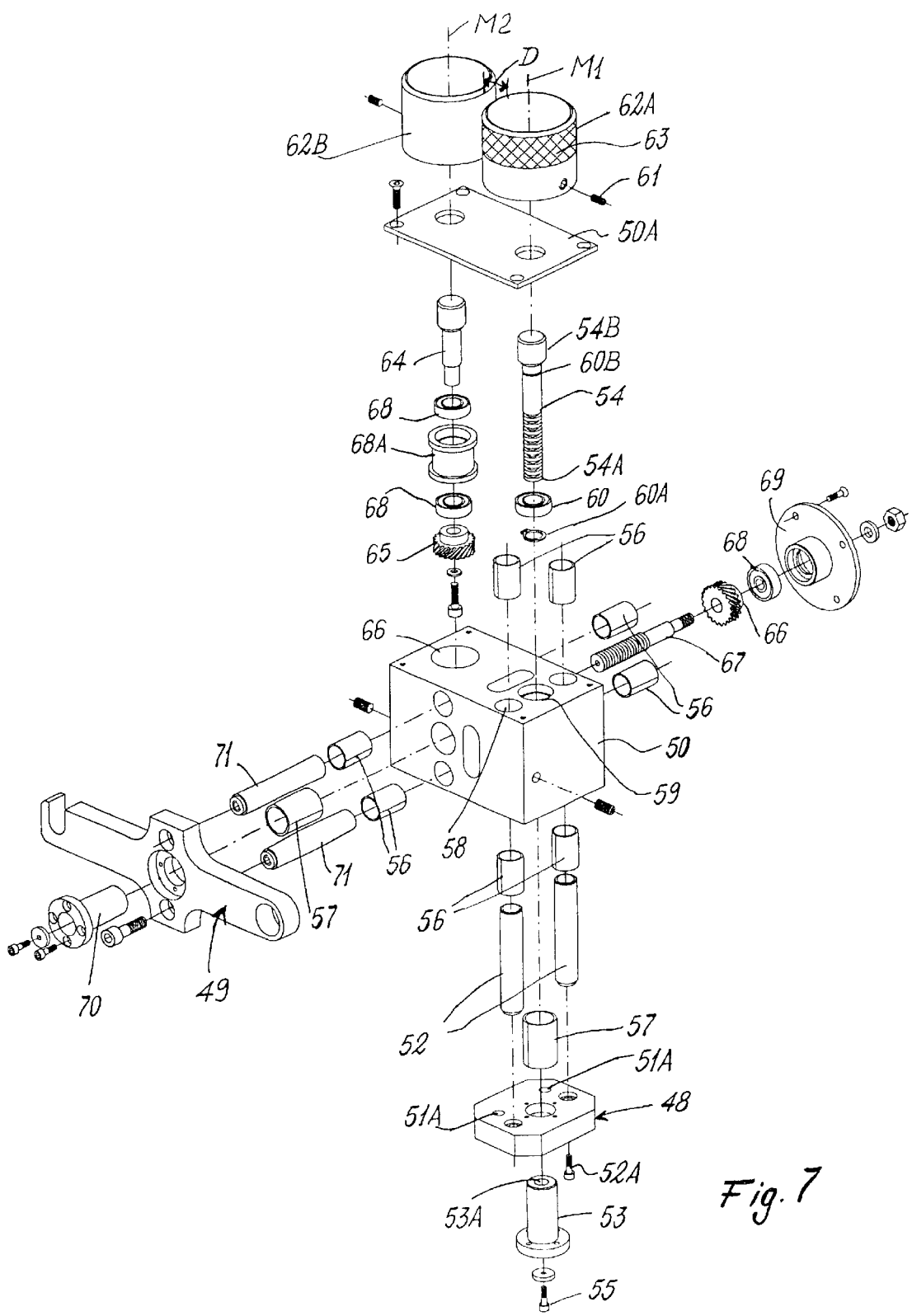
FIG. 7 is an exploded view of these means.
Figure 8:
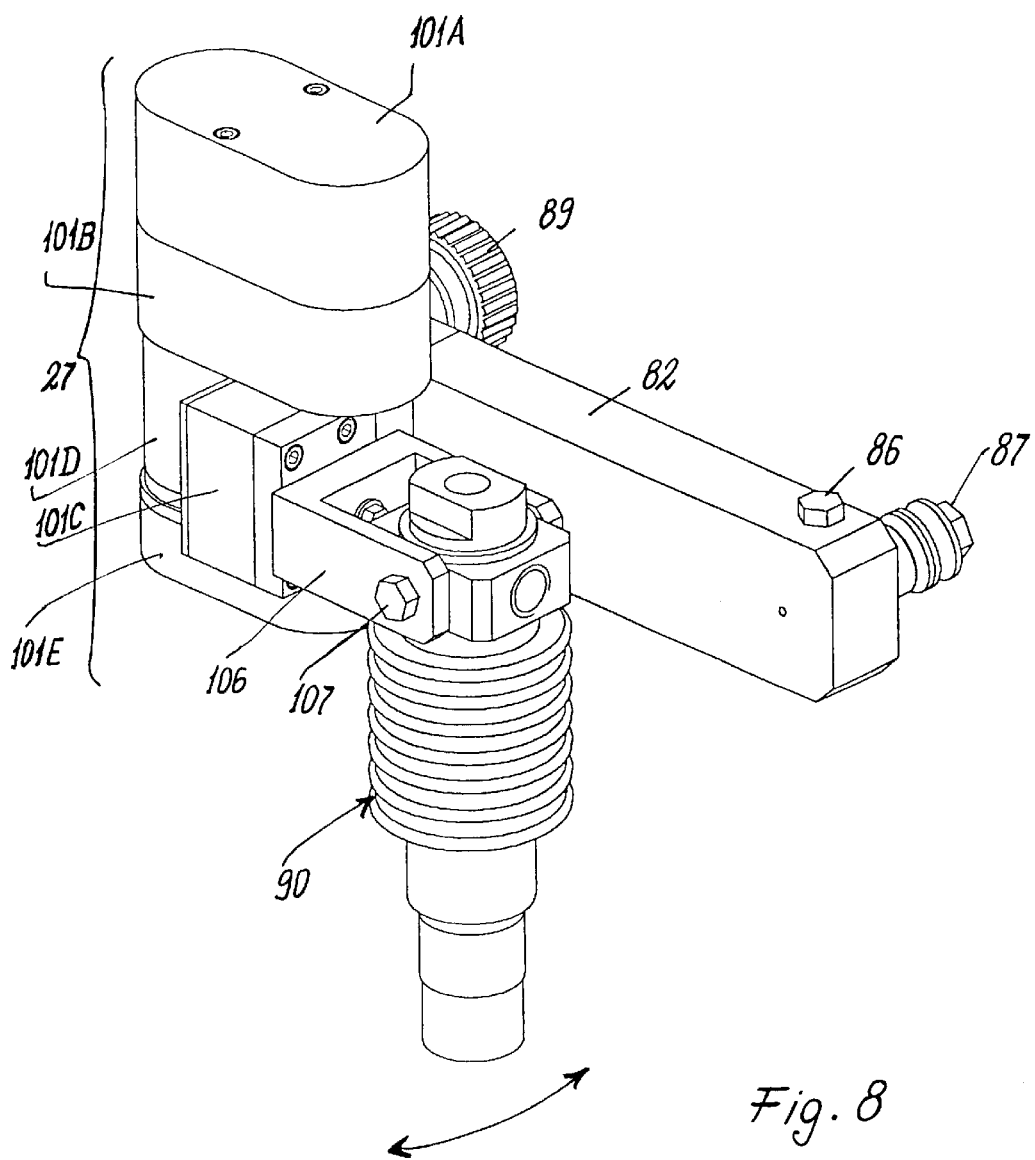
FIG. 8 is a schematic perspective view of the working device.
Figure 8A:
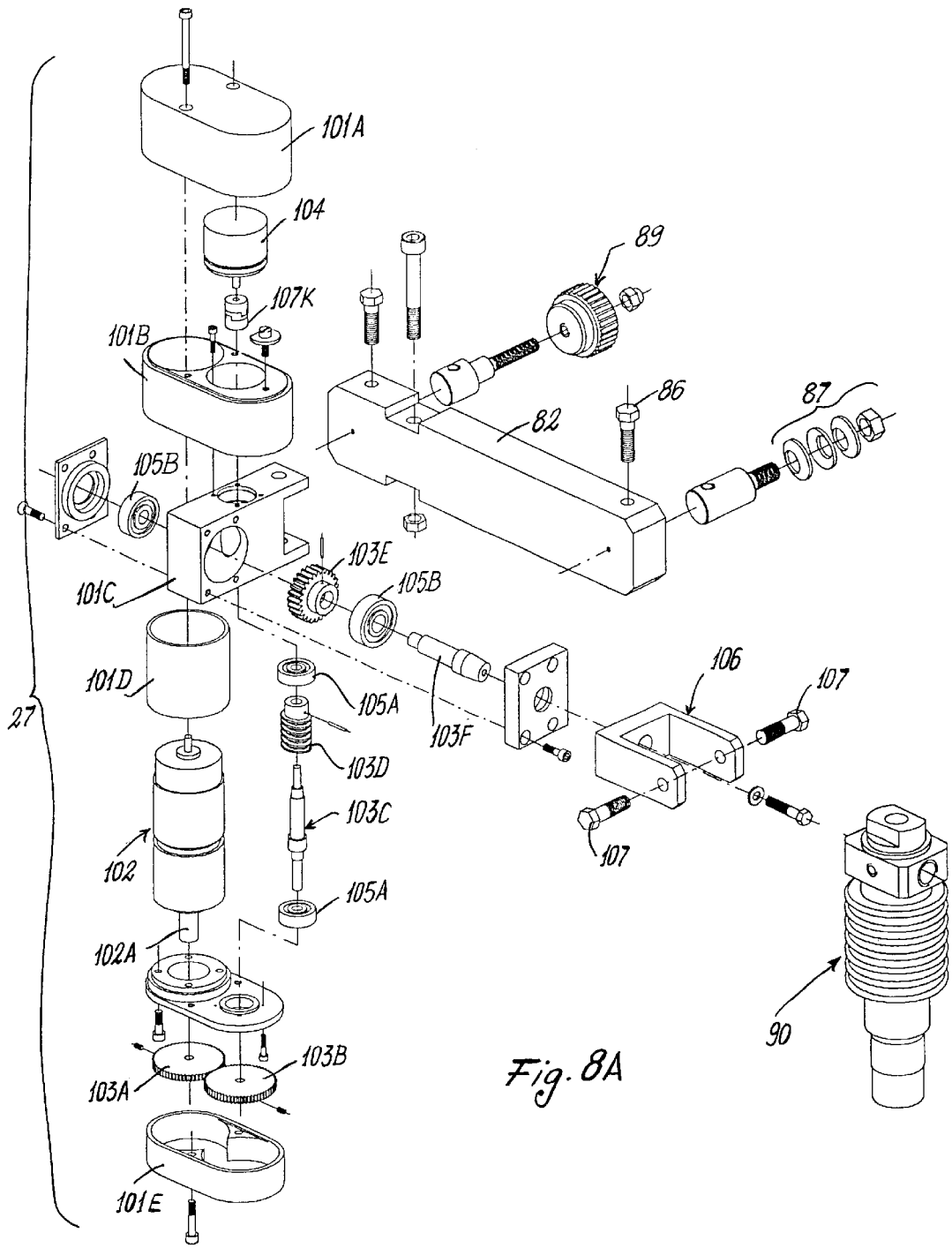
FIG. 8A is is an exploded view of this device.
Figure 9:
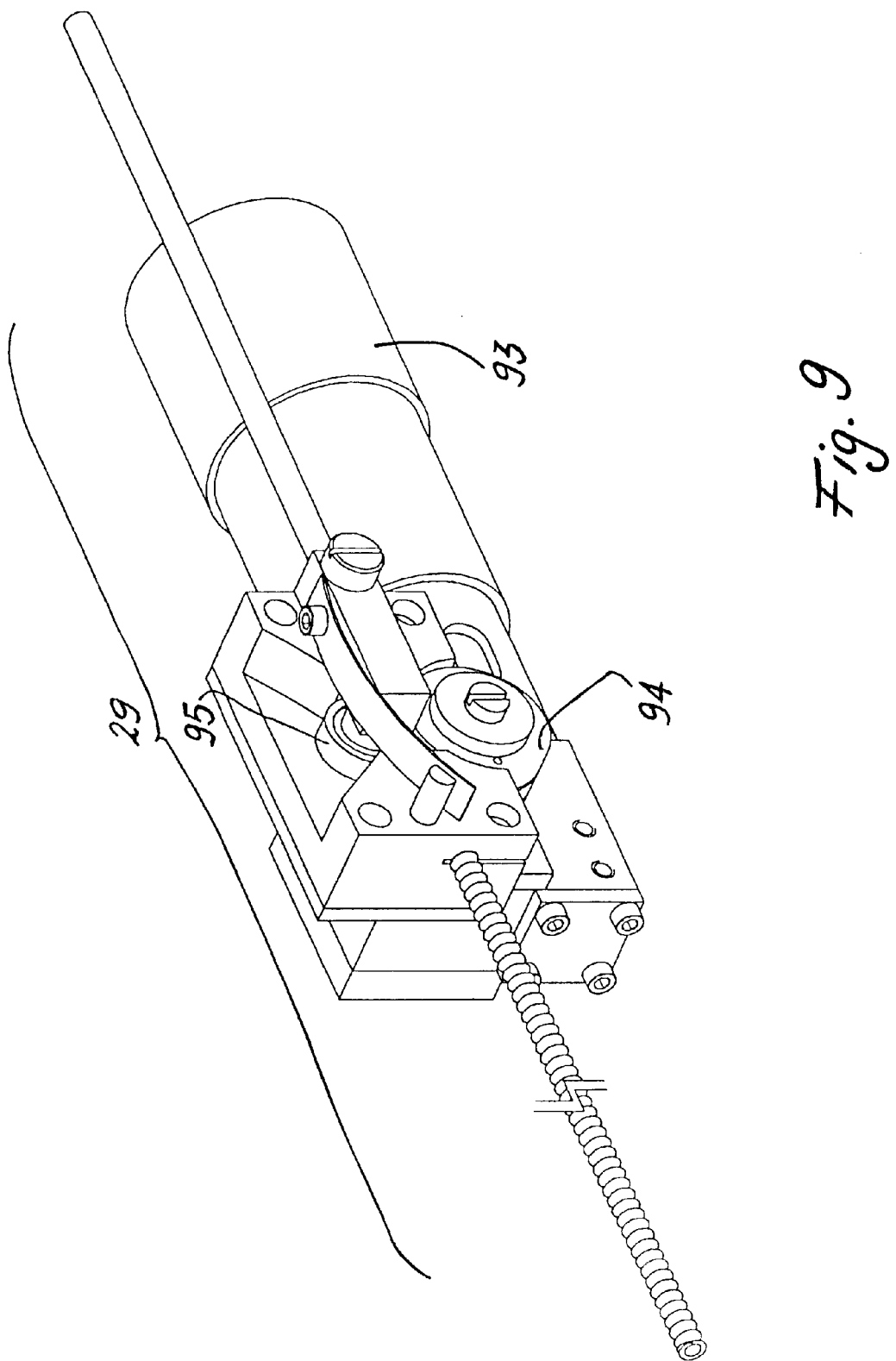
FIGS. 9 and 10 are two schematic perspective views of means of moving the filler wire and a support for a reel of the said wire.
Figure 10:
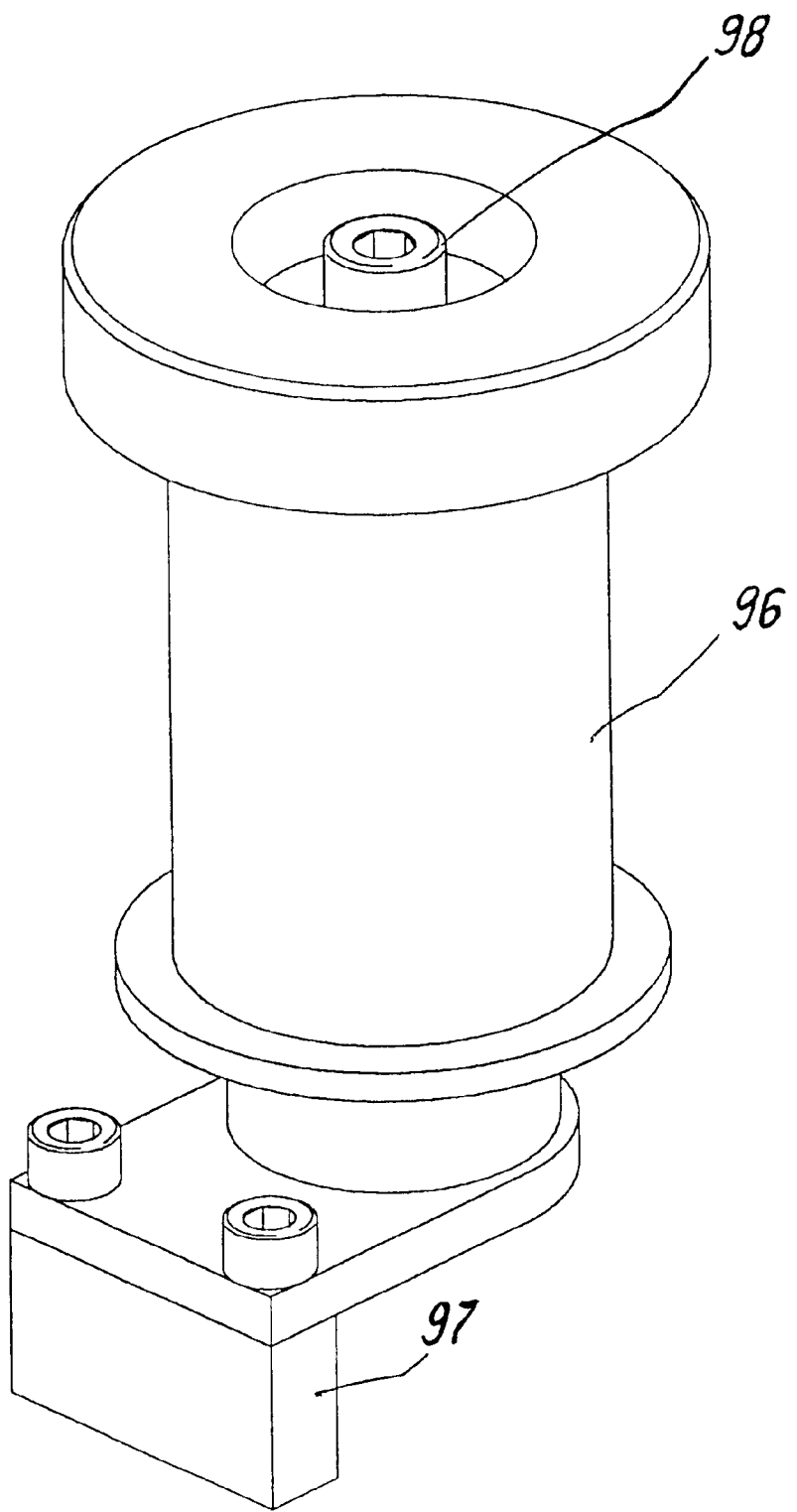

It should be noted that the two knobs 74A, B could also be arranged with their axes of rotation parallel to each other, using gears of an ordinary type, in a way entirely similar to that described in FIG. 7.

Figure 6:
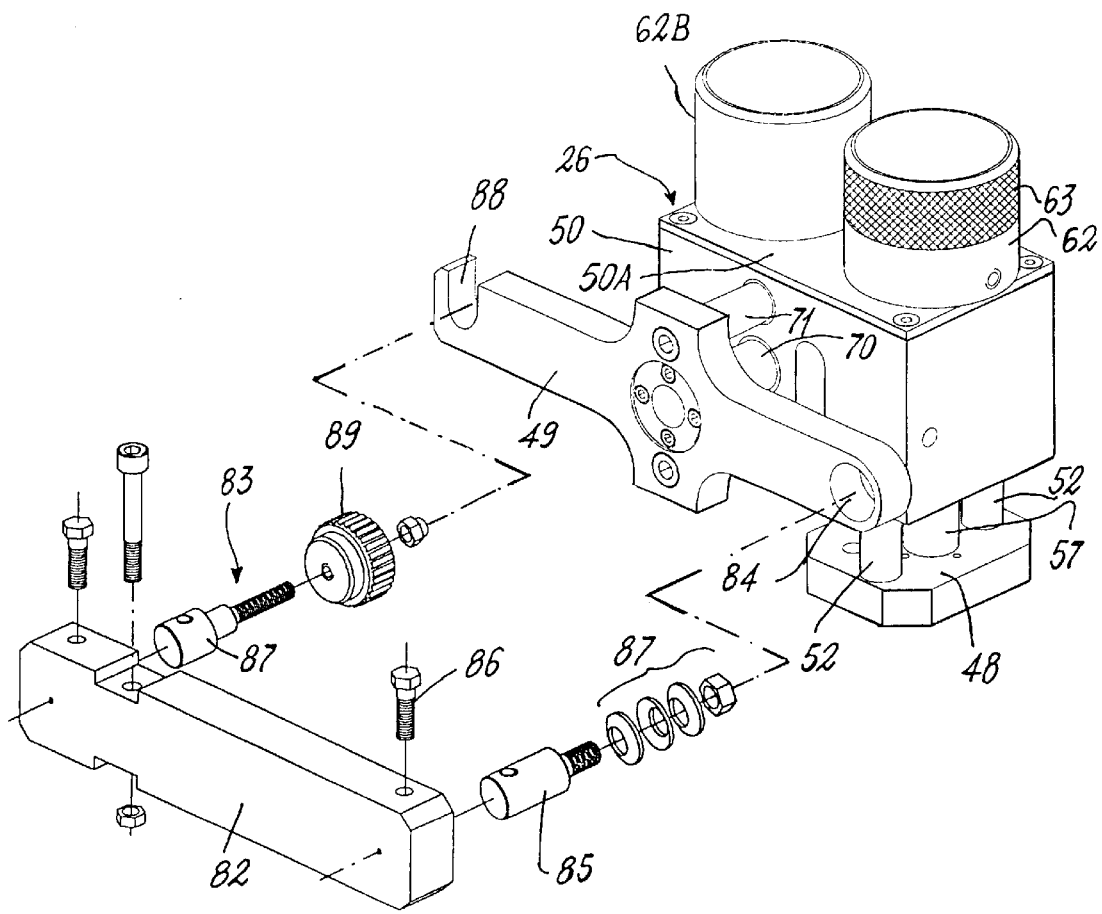
FIG. 6 is a schematic perspective view of the manual means for the vertical and horizontal movement of the working device.

Preferably, the working device is not connected directly to the bar 49, but to a lever 82 hinged on one end of the bar 49 and permanently connected to the other end by conventional fastening means 83. For this purpose, as shown in FIG. 6, the bar 49 has a hole 84 for the passage of a pin 85 whose head penetrates into a hole made in the lever 82 and is fixed to this lever by a screw 86. The pin 85 has a threaded end on which are fitted Belleville springs and a screw (indicated jointly by 87) which prevent the pin 85 from emerging from the hole 84 and provide sufficient pressure to keep the arm stable even in the raised position. The tightening means 83 comprise a further pin 87, which is fixed like the other to the lever 82, and on whose threaded part a tightening wheel 89 is fitted. The pin 87 can engage in a recess 88 in the bar 49 while the knob 89 can be tightened against the face of the bar which is not visible, and which surrounds the said recess 88. The welding torch 90, which is fixed rigidly to the lever 82, can easily be rotated by means of the bar 49 and the lever 82, thus facilitating the cleaning and maintenance of the torch, especially when the carriage is connected to a guide strip.

The lever 82 is advantageously made from an insulating material, so that the working device is electrically insulated from the components of the carriage.

The means 29 for feeding the welding wire 92 to the torch 90 are essentially of a conventional type, and comprise a direct current motor 93, which by means of a worm gear transmission moves a wire guide wheel 94 which, interacting with an idle wire compression wheel 95, makes the welding wire advance. A conventional sensor, for example an encoder 193, capable of supplying to the fixed control unit 18 of the device a signal relating to the movement of the welding wire, is also provided.

The supporting means 28 of a reel 96 for the welding wire are also conventional and comprise a conventional braked pin (not shown) carrying the reel and connected to a base 97 which in turn is connected to the part 8 of the carriage. It should be noted that the vertical arrangement of the reel enables the overall dimensions to be reduced and allows the reel to be removed by unscrewing the screw 98 while remaining within the profile of the carriage.

The means 27 for moving the welding torch 90 comprise a body formed by five parts 101 A-B-C-D-E, shaped in such a way as to house a geared motor unit 102 and the corresponding elements 103A-B-C-D-E-F for transmission of the motion, and a sensor 104 capable of detecting the oscillatory movements of the torch 90.

The geared motor unit 102 has a conventional direct current motor with a reduction unit. The shaft 102A of the reduction unit is connected to a first gear wheel 103A which transmits the motion to a second wheel 103B of the same diameter, which in turn is connected to a first shaft 103C supported by ordinary bearings 105A. The shaft is fixed rigidly to the center of a worm gear 103D which, by interacting with an annulus gear 103E and a second shaft 103F supported by conventional bearings 105B, transmits the motion to a fork 106 to which the welding torch 90 is fixed. It should be noted that the worm gear 103D and the annulus gear 103E have a high reduction ratio, so that even oscillations of very small amplitude, 2 mm for example, can be imparted to the torch 90.

The welding torch 90 is also advantageously hinged to the arms of the fork 106 by two screws 107, so that the inclination of the torch in the plane perpendicular to the plane of oscillation can be varied.

The upper end of the first shaft 103C is rigidly fixed by a joint 107K, advantageously of the Holdam type, to the sensor 104. This sensor is advantageously a position transducer, for example a continuously rotating servo potentiometer.

The part 101C has a fork-shaped end which can be fixed rigidly by a screw to the arm 82.

The control unit 108 of the device (with an external power supply at 24 V d.c.) is fixed rigidly in a conventional way to the carriage 1, and has, as shown in FIG. 14, an interface 109 comprising a plurality of operating keys 110 A-B-C-D-E-F-G-H-I, a multi-position rotary switch 111 without a rotation end stop, three indicator lamps 112, and a conventional socket 113 for a data input/output cable.

The functions of the keys 110 A-B-C-D-E-F-G-H-I are as follows:
 starting a welding cycle (110A)
 striking the welding arc (110B)
 enabling the storing of a vertical start-stop position of the torch oscillation (110C)
 carrying out a test movement of the carriage (110D)
 carrying out a test advance of the welding wire (110E)
 carrying out a test oscillation of the torch (110F)
 carrying out a test supply of current to the welding wire (110G)
 carrying out a test emission of the gas required for the welding (110H)
 varying the programmed carriage travel speed by up to +/−15%.

The switch 111 has different positions (12 in the example shown), each of which selects a predetermined set of parameters for carrying out a particular welding pass.

The three indicator lamps 112 indicate that the control unit is on, that the device is in operation, and that an error has occurred.

FIG. 13 shows a circuit diagram of the control unit 108.

The control unit 108 is of a conventional type and comprises, for example, ordinary microprocessor processing means 114, ordinary storage means 115, ordinary means 116A–B C, 216A, 216B for controlling the power supply, respectively, to the motor 102 (of the means 27 for oscillating the welding torch), to the motor 33 (for advancing the carriage), to the motor 93 (for advancing the welding wire), and to the motors 73A,B (for the powered vertical or horizontal movement of the torch).

The unit 108 also comprises ordinary means 117 for converting the analog signal obtained from the potentiometer 104 of the oscillation means 27 to a digital signal; ordinary means 118 for receiving the signals generated by the encoders 133, 193 associated with the motors for the carriage and wire advance, ordinary means 119 for sending the corresponding control signals (ON-OFF) for the gas flow and welding current.

The unit 108 also has ordinary means 120 for connection to a conventional remote programming unit 121 which can send the parameters for the execution of each welding pass to the control unit 108. The connection between the remote control unit 121 and the fixed control unit 108 is of a known type; for example, a cable removably connected to the unit 108, or conventional means of infrared transmission can be used. The number 120 in FIG. 13 indicates means for receiving the data transmitted by the remote unit, for example a socket for a cable or an IR receiver.

The control unit 108 has ordinary input means 122 connected to the keys 110 A-B-C-D-E-F-G-H-I, to the switch 111, to further keys 123 A-B-C fixed to the carriage (but not shown in FIG. 1) and capable of interrupting all the operations of the device and carriage, and of increasing or decreasing the speed of movement of the carriage by 15%. It should be noted that after the stop key 123A has been pressed once, the control unit 108 advantageously enables the motor 33 to be restarted at the same speed as it had when the key was pressed. If, however, the key is pressed twice, the unit 108 makes the motor 33 restart at the stored speed for the current pass. Thus, if the machine is stopped when the stored speed has been changed by ±15%, the machine can restart at the changed speed.

The input means 122 are also connected to further conventional remote interface means 124, separated from the carriage and connected to the unit 108 by cable, for example.

The remote means 124 comprise a plurality of keys 124 A–H which can send signals to the input means 122 relating to the following:

- interruption of all operations of the device and carriage (124A)
- increase or decrease of the speed of movement of the carriage by 15% (124B)
- start of welding cycle (124C)
- start of welding arc (124D)
- movement of the welding torch to the left (124E), to the right (124F), upwards (124G) or downwards (124H).

It should be noted that the remote interface means 124 are of a conventional type and are connected to the fixed unit 108 either by a cable or by an infrared connection or in another known way; these interface means have a conventional keypad by means of which the welder can control the carriage even if he is at a certain distance from the carriage. It should be pointed out that the remote interface means 124 have a key 124A for switching off the device completely, a key 124B for increasing or decreasing the carriage speed by 15%, a key 124C for switching the device on, a key 124D for enabling the sending of the welding current and four keys 124E–H for controlling the motors 73A–B (FIG. 11), in other words for raising or lowering the torch (90) and for bringing it closer or moving it away, with respect to the carriage 1.

The control unit 108 is connected to an electrical power source 125 (at 24 V d.c. for example).

Before the operation of the unit 108 is described, it should be pointed out that the remote programming unit 121 can be used to send to the fixed unit 108 the desired values for each welding pass, in respect of:

- the speed of travel of the carriage along the guide and the direction of movement (clockwise or anti-clockwise);
- the frequency of oscillation of the torch;
- the amplitude of oscillation of the torch;
- the STOP time of the torch at the limits of oscillation;
- the speed of advance of the welding wire;
- the delay before the interruption of the welding current.

For each selection position of the switch 111, therefore, the unit 108 has a stored set of predetermined desired parameters received from the unit 121, for the various moving parts of the device and of the carriage.

For example, in the case of the second welding pass, corresponding to position 2 of the switch 111 (FIG. 14), the fixed unit 108 might have in its memory:

- carriage travel speed: 40 inches per minute
- frequency of oscillation: 10 per inch of advance of the carriage;
- amplitude of oscillation: learnt by moving the torch by means of the unit 121 from one desired limit to the other, storing the two limit position as will be described subsequently;
- stop time at the limits of oscillation: 0.05 s
- speed of advance of wire: 350 inches per minute;
- delay before current interruption: 0.05";
- torch start and stop position, learnt by moving the torch by means of the keys of the interface 109 as will be described subsequently.

The operation of the unit 108 is illustrated in the block diagram in FIG. 15, which will not be described in detail because it is immediately understandable to a person skilled in the art.

It should be pointed out that the unit 108 makes it possible to identify a start and stop position for the torch oscillation (by pressing a particular combination of keys on the interface 109), and to store this in the unit 108 by means of the corresponding potentiometer signal 104, by using the key 110C. This position is not always vertical. This is not the case, for example, when the two pipes rest on a ground or support which is inclined.

The unit 108 proceeds to send the value corresponding to the desired start and stop position to the remote programming unit 121, which in turn stores this value. To identify the stop position it is possible, for example, to proceed as follows: when the keys 110A and 110D are held down simultaneously and the switch 1101 is turned on, the unit 108 makes the torch oscillate slowly (to the right or left, according to the position of the switch 1101). When the torch reaches the desired position, in other words the start and stop position, the key 110C is pressed and the unit 108 reads the potentiometer value for this position and stores it. Advantageously, the unit 108 can also be used to store a new stop and start position, and, simultaneously and automatically, to modify the limit positions of the oscillation amplitude stored previously. In other words, if certain values of oscillation amplitude were stored previously for a stop and start position, and if the start and stop position is subsequently varied, by two degrees towards the right for example, the stored limit values of oscillation will also be varied by two degrees. This procedure can be activated, for example, by pressing three phases of the interface 109 simultaneously. It should be noted that the last procedure described is particularly advantageous if inclined pipes or pieces of different thickness are to be welded.

The carriage movement procedure is illustrated in the block diagram in FIG. 18. This procedure consists of starting the travel of the carriage and checking, at predetermined intervals, that the speed of the carriage corresponds to the desired speed, and, if it does not, regulating the speed. For this last-mentioned control process, the control unit 108 detects, stores and compares at regular intervals the signal generated by the encoder associated with the motor 33. If the speed detected is not equal to the predetermined speed, the speed of the carriage is automatically returned to this speed. The procedure is also used (not shown in FIG. 18) to check at predetermined intervals during the travel of the carriage whether the key for increasing or decreasing the travel speed by 15% has been activated. In case of activation, the unit 108 proceeds to vary the preset values of the oscillation speed to keep the oscillation frequency constant.

The procedure for the oscillation of the welding torch is shown schematically in FIG. 16.

It should be noted that the left- and right-hand limit values are identified by the control unit by associating these values with the corresponding values on the potentiometer scale.

FIG. 19 shows the procedure for moving the welding wire, which will not be described in detail since it is immediately understandable.

Returning to the diagram in FIG. 15, it should be noted that the procedures of turning the welding gas and the welding current on or off are conventional automatic procedures and that, consequently, they will not be described in detail. For the same reason, no description will be given of the devices (indicated in a general way by 128 in FIG. 13) or of the sensors relating to the above functions.

It should be noted that owing to the presence of the potentiometer, the control unit 108 is capable, at each successive instant, of associating the welding torch 90 with a signal relating to its position at this instant, and of calculating the time taken to reach this predetermined position. By means of the above signals, the control unit can not only reverse the oscillation once the predetermined limits have been reached, but also calculate and if necessary correct the oscillation speed to maintain the set frequency both when the carriage travel speed is changed manually by the operator, and when the torch stops for a predetermined period at the limits of the oscillation.

It should also be noted that, advantageously, the remote programming unit 121 (FIG. 13) capable of sending the parameters relating to the various welding passes to the unit 108 is not mounted on the carriage 1, but is detached from it. Thus the welder is prevented from intervening in the welding procedures. Additionally a single unit can be used to "program" a number of welding machines. In order to monitor the use of the device, the unit 108 may advantageously also have a memory 129, in which the welding parameters are stored instant by instant. This memory may be within the unit 108 or may be external and removable, for example one of the memory card type.

It should also be pointed out that in the device according to the invention the control unit of the device is entirely mounted on the carriage and that, therefore, no remote control units, connected to the carriage by cables or in other known ways, are necessary.

The remote programming unit 121 is of a conventional type and is shown schematically in FIG. 17; it comprises an ordinary alphanumeric display 129, an ordinary alphanumeric keypad 130, microprocessor means 131, storage means 132, means 133 capable of transmitting a plurality of selected and stored data to the fixed control unit 108, and means 134 capable of supplying electrical power to the remote unit.

The remote unit 121 comprises a program which, when the unit is switched on, sends to the display 129 a set of screens, on reading which the operator can press the keys 130 to carry out a plurality of functions (described in detail subsequently).

FIG. 20A shows schematically the nine main screens which appear in succession on the display 129 of the remote unit 121. The first screen 140 shows the identification code of the remote unit used, and requests the entry of an access code; when this is keyed in, the remote unit displays a second screen 141 in which there is a request to state whether the units of measurement to be used are inches or centimetres. When these data have been entered, a third screen 142 appears, asking whether the parameters stored in the unit are to be displayed. If the answer is affirmative, the unit displays a set of screens shown in FIG. 20b which will be described subsequently; if it is negative, a fourth screen 143 is displayed, giving access to a set of further screens shown in FIG. 20C or allowing the operator to continue to a fifth screen 144 which permits the display of screens indicating malfunctions or errors of the devices (shown in FIG. 20D). A sixth screen 145 is provided, permitting the display of further screens capable of displaying the said malfunctions (FIG. 20E), as well as a seventh screen 146 capable of displaying further screens for setting the parameters for the welding passes (FIG. 20f). An eighth screen 147 is provided, permitting the display of further screens for changing the password, as well as a final screen 148 capable of displaying the identification code of the last remote unit which has changed the welding parameters in the control unit 108.

With reference to FIG. 20B, this shows the screens which appear in sequence when the values stored by the unit 121 for a particular welding pass (No.1) are to be displayed. For the other welding passes, the screens are identical to those shown in FIG. 20b. These screens will be understood immediately by persons skilled in the art and will not be described in detail.

It should be noted, however, that there are two ways of displaying the values of the different passes: either the switch 111 on the interface 109 of the control unit 108 is set to the pass which is to be displayed and the unit 108 then sends a signal to the unit 121 which will display the values relating to the selected pass identified by this signal; or the screens of this sub-program are scanned until a set of screens (not shown) is reached from which it is possible to select the screens relating to the stored parameters of any of the welding passes.

With reference to FIG. 20C, this shows the screens which appear in sequence when the unit 121 has to be commanded to send the stored data to the unit 108 or to receive the data which the latter has in memory (because a new unit 121 is to be reprogrammed, for example). These screens will be understood immediately by persons skilled in the art and will not be described in detail. Preferably, the unit 121 requests the entry of a second password, via a suitable screen which is not shown, before granting access to the screens in FIG. 20c. It should also be noted that when the data are sent to the unit 108 all the data stored previously in this unit will be deleted. Advantageously, another screen is provided which enables the stored parameters to be sent to an external device, for example a printer or a personal computer.

With reference to FIG. 20D, this shows by way of example one of the screens which appear in sequence when the device malfunction or error messages are displayed. The error messages may relate to a plurality of parts of the device, for example to the malfunction or failure of one of the motors or sensors or keys present on the welding carriage. The unit 108 detects the malfunctions or the errors, switches on the indicator lamps of the interface 119, and sends a corresponding signal to the remote unit 121, which can thus, when required, display the location of the error or malfunction on a screen.

With reference to FIG. 20E, this shows the screens used to start a test of the various components of the device and those relating to the replies in cases where a malfunction is detected. These screens will be understood immediately by persons skilled in the art, and will not be described in detail. It should be noted that the test which can be conducted by the unit 121 differs from that which can be conducted by means of the keys of the interface 109. The tests of the unit 121 are of very short duration (one millisecond, for example) and are therefore imperceptible to the welder. Thus, for example, if the operation of the carriage advance motor 33 is to be tested, this motor is turned on only for the time taken to receive a signal from the corresponding encoder 133, indicating that this motor has or has not been activated.

With reference to FIG. 20F, this shows the screens used to store the parameters to be stored for each pass. These screens will be understood immediately by persons skilled in the art, and will not be described in detail. It should be noted that, in order to store the oscillation amplitude, the operator must move the torch for each pass, using two keys (for example the + and − keys) of the keypad 130 of the remote unit 121. When the torch has reached the desired position (corresponding to the required amplitude) the operator presses a confirmation key, for example ENTER, to command the unit 108 to send to the unit 121 a signal corresponding to that detected by the potentiometer 104; this signal is then stored by the unit 121.

As in the case of the display of the settings, the pass to which specified values is to be assigned can be selected either by operating the switch 111 of the unit 108 or by means of suitable screens (not shown).

It should be noted that the remote unit could have means of a different type from the "screen" means described up to this point for the interaction of the welder with the unit. These means, of a type which is conventional to the person skilled in the art, could, for example, provide a plurality of keypad commands for the various functions to be controlled, displayed and set.

Finally, it should be emphasized that the embodiment illustrated up to this point has been described purely by way of example and that numerous variants are possible, all being included within the same inventive concept. In the first place, it should be noted that the means 27 for oscillating the welding torch and the fixed control unit 108 of the device could also be associated with a carriage of a known type. It should also be pointed out that the means 101 for detecting the oscillation of the torch could be of a different type from that described and/or positioned in a different way. For example, an absolute encoder could be used in place of a servo potentiometer 121.

Similar considerations are applicable in respect of the powered means 102 and the means 102A-B-F for transmitting the motion to the torch 90; these also could be of a different type and/or configuration.

It is also pointed out that the carriage 1, the carriage movement means 33 and the means 26 for vertical and horizontal movement of the torch 90 might also be used on devices of a known type, either individually or in combination with each other.

In a simplified version of the device, the control means (108) might control only the means (27) for the oscillatory movement of the welding torch, and not the carriage movement means (25) or those (29) for moving the welding wire.

In another simplified version, the programming unit 121 might be not remote but incorporated in the control unit 108, or in any case fixed to the carriage and movable with it.

Finally, it should be pointed out that in the present context the device according to the invention has been described with reference to an application for the butt welding of pipes, but that the device could also be used for welding parts of a different shape, for example flat parts or those which are concave or convex with a cross-section forming an arc of a circle.

What is claimed is:

1. A device for butt welding pipes (99A–B) comprising:
   a guide element (17) which can surround and can be fixed to one of the ends of the pipes;
   a carriage (1) movable along the guide element, the carriage (1) having a powered means (25) to move the carriage along the guide element (17);
   a welding torch (90);
   supporting means (26) for supporting the said welding torch (90) and moving it vertically and horizontally with respect to the carriage;
   a feeding means (29), said feeding means automatically feeds a welding wire to the welding torch;
   a movement means (27) for moving said welding torch in an oscillating way with respect to the carriage in a direction approximately parallel to the axis of the pipes to be joined;
   a regulation means (108), said regulation means controls the amplitude of oscillation and the time for which the torch remains in one or both limit positions of the oscillation, wherein said regulation means has a generating means (104), said generating means generates a signal relating to the angular movement of the welding torch (90) during the oscillation, wherein the regulation means (108) are of the electronic type and has a storage means (115), the storage means stores, for at least one of the stages of a welding operation, a plurality of values relating to the frequency and amplitude of oscillation of the welding torch (90) desired for the welding stage and a start and stop position of the torch oscillation; and
   a control means (114) for automatically controlling the movement means (27) for oscillating the welding torch (90) in relation to the stored values and to the signals generated by the generating means (104).

2. Device according to claim 1, wherein the powered means (25) has a transmission means (133) for generating a signal relating to the movement of the carriage (1) along the guide strip (17), in that the storage means (115) are capable of additionally storing, for at least one of the stages of a welding operation, the desired speed of the carriage (1) along the guide strip, and in that the control means (114) control the powered means (25) for moving the carriage and the movement means (27) for the oscillatory Movement in accordance with stored values of the speed of travel of the carriage and of the frequency and amplitude of oscillation, and in accordance with the signals generated by the means (104, 133) of detecting the angular movement of the welding torch (90) and the movement of the carriage (1).

3. The device according to claim 2, wherein the feeding means (29) has a detecting means (193) that generates a signal relating to the speed of feeding of the wire, in that the storage means (115) are capable of additionally storing, for at least one of the welding stages, the desired speed of advance of the welding wire, and in that the control means (114) control the powered means (29) for advancing the wire in accordance with the stored values and with the signals generated by the detecting means (193).

4. The device according to claim 1, wherein the storage means (115) stores additional values, for at least one of the welding stages, the time for which the welding torch (90)

stops in the limit positions of the oscillation, and in that the control means (114) control the means of oscillatory movement (27) in accordance with the stored values.

5. The device according to claim 1, wherein the control unit (108) for the regulating means is associated with the carriage (1).

6. The device according to claim 1, wherein it comprises programming means (121) capable of sending to the regulating means (108) values which are stored by the storage means (115).

7. The device according to claim 6, wherein the programming means (121) has an other storage means (131) that stores a plurality of desired values for each state of a welding operation, the values comprising at least the amplitude and frequency of oscillation of the welding torch (90) an interface (129, 130) the entry of the values and the selection of the stored values, transmission means (133) capable of sending the selected values to the regulating means (108), and control means (131) that manages the storage, selection and sending of the entered data.

8. The device according to claim 6, wherein the programming means (121) are external to, and separate from the carriage.

9. The device according to claim 1, wherein the regulating means (108) comprise an element (111) that selects the desired stored value of a welding pass, test elements (110D–H) that select a test operation cycle; powered means (25) for moving the carriage, feeding means (29) for moving the welding wire, movement means (27) of oscillatory movement, a means for starting and stopping the supply of the welding current, a means of starting and stopping the supply of the welding gas; starting elements (110A) to start the device, and striking elements (110B) to strike a welding arc.

10. The device according to claim 1, wherein the regulating means (108) comprise a learning means (110C) that stores a horizontal and vertical reference position of the welding torch (90).

11. The device according to claim 1, wherein the regulating means (108) comprise means (110I) capable of permitting the increase and decrease of the speed of the carriage (1) in a range between two predetermined limit values, and a matching means to match the values of the speed of oscillation of the welding torch (90) to the increases and decreases of speed, and to control the movement means (27).

* * * * *